US010909681B2

(12) United States Patent
Hsiao et al.

(10) Patent No.: US 10,909,681 B2
(45) Date of Patent: Feb. 2, 2021

(54) AUTOMATED SELECTION OF AN OPTIMAL IMAGE FROM A SERIES OF IMAGES

(71) Applicant: THE REGENTS OF THE UNIVERSITY OF CALIFORNIA, Oakland, CA (US)

(72) Inventors: Albert Hsiao, San Diego, CA (US); Naeim Bahrami, San Diego, CA (US); Tara Retson, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 13 days.

(21) Appl. No.: 16/239,303

(22) Filed: Jan. 3, 2019

(65) Prior Publication Data

US 2020/0219262 A1 Jul. 9, 2020

(51) Int. Cl.
*G06T 7/00* (2017.01)
*G06K 9/62* (2006.01)

(52) U.S. Cl.
CPC .......... *G06T 7/0016* (2013.01); *G06K 9/6268* (2013.01); *G06T 2207/10088* (2013.01); *G06T 2207/20021* (2013.01); *G06T 2207/20084* (2013.01); *G06T 2207/30168* (2013.01)

(58) Field of Classification Search
CPC ......... G06T 7/0016; G06T 2207/30168; G06T 2207/10088; G06T 2207/20084; G06T 2207/20021; G06K 9/6268
See application file for complete search history.

(56) References Cited

U.S. PATENT DOCUMENTS

| 9,513,357 | B2 | 12/2016 | Hsiao et al. |
| 10,398,344 | B2 | 9/2019 | Beckers et al. |
| 10,628,943 | B2 * | 4/2020 | Hsieh .................... G16H 40/40 |
| 10,698,061 | B2 | 6/2020 | Hsiao et al. |

(Continued)

OTHER PUBLICATIONS

Shin, Hoo-Chang, et al. "Interleaved text/image deep mining on a very large-scale radiology database." Proceedings of the IEEE conference on computer vision and pattern recognition. 2015. (Year: 2015).*

(Continued)

*Primary Examiner* — Nirav G Patel
(74) *Attorney, Agent, or Firm* — Eleanor Musick; Musick Davison LLP

(57) ABSTRACT

A method for identification of an optimal image within a sequence of image frames includes inputting the sequence of images into a computer processor configured for executing a plurality of neural networks and applying a sliding window to the image sequence to identify a plurality of image frame windows. The image frame windows are processed using a first neural network trained to classify the image frames according to identified spatial features. The image frame windows are also processed using a second neural network trained to classify the image frames according to identified serial features. The results of each classification are concatenated to separate each of the image frame windows into one of two classes, one class containing the optimal image. An output is generated to display image frame windows classification as including the optimal image.

25 Claims, 17 Drawing Sheets
(10 of 17 Drawing Sheet(s) Filed in Color)

(56) References Cited

U.S. PATENT DOCUMENTS

| | | | |
|---|---|---|---|
| 2012/0078084 | A1 | 3/2012 | Piechnik et al. |
| 2014/0112564 | A1 | 4/2014 | Hsiao et al. |
| 2016/0338613 | A1 | 11/2016 | Beckers et al. |
| 2017/0045600 | A1 | 2/2017 | Hsiao et al. |
| 2018/0256042 | A1 | 9/2018 | Beckers et al. |
| 2018/0285699 | A1 | 10/2018 | Kolouri et al. |
| 2018/0333104 | A1* | 11/2018 | Sitek ............ G06N 5/046 |

OTHER PUBLICATIONS

Hasan, Sadid A., et al. "Attention-based medical caption generation with image modality classification and clinical concept mapping." International Conference of the Cross-Language Evaluation Forum for European Languages. Springer, Cham, 2018. (Year: 2018).*

Schuhmacher, M. Autonomous anatomical structure recognition using machine learning. MS thesis. University of Twente, 2018. (Year: 2018).*

Akkus, Z., et al.; "Deep Learning for Brain MRI Segmentation: State of the Art and Future Directions"; J Digital Imaging; 2017; pp. 449-459.

Biglands, J.D., et al. Cardiovascular magnetic resonance physics for clinicians: part II; Journal of Cardiovascular Magnetic Resonance, 2012; 14:66; 40 pages.

Burt, J.R., et al., "Myocardial T1 Mapping: Techniques and Potential Applications", RadioGraphics 2014; vol. 34 No. 2, pp. 377-395.

Girshick, R., et al.; "Fast R-CNN"; Sep. 27, 2015; arXiv:1504.08083v2 [cs.CV]; 9 pages.

Guan, Y., et al.; "Ensembles of Deep LSTM Learners for Activity Recognition using Wearables"; Mar. 28, 2017; arXiv:1703.09370v1 [cs.LG]; 28 pages.

Isin, A, et al.; Review of MRI-based Brain Tumor Image Segmentation Using Deep Learning Methods; Procedia Computer Science; 2016; vol. 102, pp. 317-324.

Jellis, C.L., et al.; Myocardial T1 mapping: modalities and clinical applications; Cardiovascular Diagnosis and Therapy 2014; vol. 4, pp. 126-37.

Karim, F., et al.; "LSTM Fully Convolutional Networks for Time Series Classification", IEEE Access; 2018; vol. 6, pp. 1662-1669.

Kather, J.N., et al.; Color-coded visualization of magnetic resonance imaging multiparametric maps; Scientific Reports; Jan. 23, 2017; vol. 7, Article No. 41107; 11 pages.

Kollias, D. et al.; A Multi-component CNN-RNN Approach for Dimensional Emotion Recognition in-the-wild; Jun. 3, 2018; arXiv:1805.01452v3 [cs.Cv]; 5 pages.

Krempl, G., et al.; Workshop on Interactive Adaptive Learning (IAL), Proceedings of the European Conference on Machine Learning and Principles and Practice of Knowledge Discovery in Databases (ECML PKDD 2018); Sep. 10, 2018, Dublin, Ireland, 103 pages.

Lieman-Sifry, J., et al.; FastVentricle: Cardiac Segmentation with ENet; Apr. 13, 2017; Pop M., Wright G. (eds) Functional Imaging and Modelling of the Heart. FIMH 2017. Lecture Notes in Computer Science, vol. 10263. Springer, Cham; 11 pages.

Liu, S. et al.- "Prostate Cancer Diagnosis using Deep Learning with 3D Multiparametric MRI" ; Mar. 3, 2017; Proc. SPIE 10134, Medical Imaging 2017: Computer Aided Diagnosis, 1013428; 4 pages.

Minetto, R., et al.; "Hydra: an Ensemble of Convolutional NeuralNetworks for Geospatial Land Classification"; Feb. 10, 2018; arXiv:1802.03518 [cs.CV]; 12 pages.

Padmanabhan, S.; Convolutional Neural Networks for Image Classification and Captioning; spring 2016; downloaded at https://web.stanford.edu/class/cs231a/prev_projects_2016/example_paperpdf ; 8 pages.

Poudel, R.P.K., et al.; Recurrent Fully Convolutional Neural Networks for Multi-slice MRI Cardiac Segmentation; Aug. 13, 2016; arXiv:1608.03974v1 [stat.ML]; 12 pages.

Prasoon, A., et al.; Deep Feature Learning for Knee Cartilage Segmentation Using a Triplanar Convolutional Neural Network; MICCAI 2013, Part II, LNCS 8150; Springer-Verlag Berlin Heidelberg, Copenhagen, Denmark; 2013; pp. 246-253.

Simonyan, K., et al.; Very Deep Convolutional Networks for Large-Scale Image Recognition; Visual Geometry Group, Department of Engineering Science, University of Oxford; Sep. 2014; eprint arXiv:1409.1556.

Iran, P.V.; "A Fully Convolutional Neural Network for Cardiac Segmentation in Short-Axis MRI"; Apr. 27, 2017; arXiv:1604.00494v3 [cs.CV].

* cited by examiner

| Attributes | LAX Localization | MV Slice Localization | Bounding Box | SAX Localization |
|---|---|---|---|---|
| Module Input | VLAX | SAX stack | | |
| Module Output | MV, Apex Localization | AV, MV, PV, TV Localization | | |
| Preprocessing | Down sampling to 128x128 | Rolling windows using focal slice and 2 basal and 2 apical slices, rotated into standard orientation, field of view cropped to 280° | Rotated into standard orientation, field of view cropped to 280° | Rotated into standard orientation, cropped bounding box to 128x128 using predicted segmentation, use slices from predicted minimum window |
| Training Data | 4 Ch, 3Ch, 2 Ch, HLAX, VLAX Planes | 5 Slice Windows From SAX Stacks | Interpolated SAX Stacks | Bounding Box Cropped SAX Windows |
| Model Type | Heatmap Regression | Classification | Segmentation | Heatmap Regression |
| Base Model | 2D U-net | Multi-channel VGG-19 | 2.5D U-net | 2.5D U-net |
| Purpose | To localize MV and Apex | To identify the first window where the focal slice is ventricular | To identify heart for the heart | To in-plane localize AV, MV, PV, TV |
| Sigma | 60 | - | - | 60 for 65 epochs, then 40 for 65 epochs |
| Epochs | 70 | 35 | 40 | 130 |
| Kernel size | 32 for top two conv layers, then 9 for each additional conv layer | 3 | 3 | 36 for top two conv layers, then 9 for each additional conv layer |
| Learning Rate | 10e-4 | 10e-4 | 10e-4 | 10e-3 |

FIG. 11

AUTOMATED SELECTION OF AN OPTIMAL IMAGE FROM A SERIES OF IMAGES

FIELD OF THE INVENTION

The present invention is related to an automated method for selecting a single optimal image from a sequence of images, where the sequence may be a time series or a stack (series) of images.

BACKGROUND

Magnetic resonance imaging (MRI) has been noted for its excellent soft tissue imaging capability with zero radiation dose. It has repeatedly been touted as the imaging modality of the future, but due to its complexity, long exam times and high cost, its growth has been severely limited. This especially has been the case for cardiac MRI, which only accounts for about 1 percent of all MRI exams in the United States.

Cardiac patients with chronic conditions such as congenital heart disease often require many imaging exams over their lifetime. These are generally performed using computed tomography (CT). However, CT exposes patients to ionizing radiation, and CT does not have the same contrast and ability to delineate soft tissues as MRI. Traditionally, obtaining a complete 3D MRI scan of the heart would require a specialized technologist to do multiple 2D acquisitions across several patient breath-holds, which could take an hour or more. While the breath-holds are necessary to cease any motion that might obscure the image, but not all patients are able to do this for the required length of time or repeatedly.

Cardiac MRI is the gold standard for quantification of cardiac volumetry, function, and blood flow. Cardiac MRI can be performed as a series of sequential image acquisitions, where earlier images inform the prescription of subsequent planes. This approach is typically composed of multiple acquisitions, including a short-axis (SAX) stack and multiple long-axis (LAX) planes, requiring multiple breath-holds by the patient. A key component of acquiring these images is the identification of specific cardiac structural landmarks by a physician or trained technologist. Proficient acquisition of high quality scans therefore requires extensive anatomical and technical expertise. Due to the limited availability of this specialized training, the benefits of cardiac MRI have been predominantly limited to major academic institutions and subspecialty centers. Artificial intelligence (AI) and deep learning methods have recently gained popularity for a variety of computer vision tasks in medical imaging ranging from disease risk stratification, segmentation of anatomic structures, and quantification of imaging features. Examples of she cited of how machine learning could be applied to cardiac MRI include assessment of plaque composition, evaluating the percentage of the heart that is ischemic or scarred following myocardial infarction (MI), looking at patterns of scarring within ischemia, wall motion abnormalities, and learning repetitive motion patterns to negate motion artifacts.

The ability to achieve high resolution, 3-dimensional imaging without the use of ionizing radiation has ushered in an age of safer and superior tissue characterization. Magnetic resonance ("MR") imaging exploits the magnetic properties of hydrogen nuclei protons within a determined magnetic field. Longitudinal relaxation time (T1) and transverse relaxation time (T2) are central properties. T1 and T2 are determined by the molecular make-up of tissue, which is primarily determined by the proportion of water content. The T1 value is defined as the time when longitudinal proton magnetization recovers approximately 63% of its equilibrium value A major advantage of myocardial T1-mapping is that it provides means for quantification of structural changes that are independent of imaging parameters, thereby allowing for objective comparisons between examinations. T1 relaxation times depend on the composition of tissues and exhibit characteristic ranges of normal values at a selected magnetic field strength. Deviation from established ranges can then be used to quantify the effects of pathological processes. Focal and global T1 changes are reported in a number of myocardial diseases such as myocardial infarction, heart failure, valvular heart disease, and systemic diseases with cardiac involvement such as amyloidosis and systemic lupus erythematosus.

Delayed enhancement cardiac MR imaging ("DE-CMR") has been widely used to detect and assess myocardial scar and viability. DE-CMR is the non-invasive gold standard for quantification of focal myocardial fibrosis and is based on the premise that there is a distribution difference of contrast between normal and fibrotic myocardium. Areas of fibrosis demonstrate greater gadolinium accumulation, which is represented as a region of high intensity signal with a shorter T1 time than adjacent normal tissue. This is clinically useful for assessment of infarction and other regional processes such as the mid-myocardial fibrosis of HCM. Conventionally this method is performed using inversion recovery gradient-echo sequences 10-15 minutes after gadolinium infusion. Retention of contrast within the extracellular space results in shortening of the inversion time and hyperenhancement relative to normal myocardium. Ischemic scar usually results in delayed enhancement in a subendocardial or transmural distribution consistent with the perfusion territories of epicardial coronary arteries, while non-ischemic fibrosis tends to be irregular and intramural or subepicardial in distribution.

Inversion Recovery (IR) pulses are used to null the signal from a desired tissue to accentuate surrounding pathology. A common use of this technique is to null the signal from normal myocardium during DE-CMR imaging. The nulled normal myocardium will be dark in contrast to the enhanced abnormal myocardium. IR pulses have a special parameter referred to as inversion time (TI), known as the myocardial null point ("$TI_{NP}$" or "TINP"), allowing the background myocardial signal to be suppressed. When attempting to null normal myocardium, one must find the appropriate TI at which the normal myocardium is dark. This usually occurs about 330 msec after the RF pulse, but can vary from person to person. To determine the appropriate TI for an individual, a TI scout series is obtained where each image in the series has a progressively larger TI. In practice, selection of TI is generally performed through visual inspection and selection of $TI_{NP}$ from the inversion recovery scout acquisition. This approach is dependent on the skill of a technologist or physician to select the optimal inversion time, which may not be readily available outside of specialized centers. Thus, several technical approaches have been proposed to address this question. For example, Gassenmaier et al., investigated the feasibility of developing a T1 mapping-based method for the selection of $TI_{NP}$ for late gadolinium enhancement cMRI. The phase-sensitive inversion recovery technique has also been widely adopted to broaden the range of acceptable $TI_{NP}$ for myocardial delayed enhancement and avoid inversion artifact from selection of early $TI_{NP}$. However, such methods still rely on visual inspection of an image series by a trained human observer to select an optimal myocardial inversion time. In addition, in certain diffuse myocardial diseases such as amyloidosis, it may be difficult to identify a single optimal null point. Further, it is known that $TI_{NP}$ varies after intravenous contrast administration, and is therefore time-sensitive. Incorrect selection of $TI_{NP}$ can impair the diagnostic quality of the images. Consistent selection of the TI time tends to be a significant problem, especially when different technicians are generating the imaging planes. In practice, this problem tends to be the most frequent cause of patient call-backs.

Convolutional Neural Networks ("CNNs") are a type of artificial intelligence (AI) that have revolutionized computer vision. Deep learning approaches such as CNNs have the potential to automate selection of inversion time, and are the current state-of-the-art technology for image classification, segmentation, localization, and prediction. A CNN is a multi-layer neural network designed to recognize visual patterns directly from pixel images (raw data) without prior feature selection and with minimal pre-processing. Rather than inputting a complete image as an array of numbers, the image is partitioned into a batch of tiles. CNNs are well-known in the art (see, e.g., Simonyan and Zisserman, "Very Deep Convolutional Networks for Large-Scale Image Recognition", *Proc. Int'l Conf. on Learning Representations* (ICLR 2015), May 7-9, 2015, arXiv:1409.1556v6, which is incorporated herein by reference.) Briefly, the basic network architecture processes images by alternating convolution and pooling layers. The most commonly used pooling technique is "max-pooling", in which the dimensions of the image are reduced by taking the maximum pixel value within each sub-region of the image. After multiple convolutional and max pooling layers, the image is flattened to change the dimension of the tensor generated by the prior steps, then the high-level reasoning in the neural network is done via fully connected layers to classify the image. Using these steps, CNN tries to predict what each tile is, then predicts what is in the image based on the prediction of all the tiles. This allows the computer to parallelize the operations and detect the object regardless of where might be located in the image.

CNNs have been applied to medical MR image analysis in two general categories: classification and segmentation. Classification assigns a label to an MRI series—normal/abnormal, level of severity, or a diagnosis. Segmentation is the process of delineating the boundaries, or "contours", of various tissues. While a CNN for classification outputs the probability of the entire image belonging to each class in question, a CNN for segmentation assigns a label to each pixel (or "voxel" if the image is 3D). Most work has been directed to segmentation, with the greatest focus on brain tumor segmentation. (See, e.g., Z. Akkus, et al., "Deep Learning for Brain MRI Segmentation: State of the Art and Future Directions", *J. Digit Imaging* (2017) 30:449-459; Isin, et al., "Review of MRI-based Brain Tumor Image Segmentation Using Deep Learning Methods", *Procedia Computer Science* 102 (2016) 317-324.) Other focuses of CNN-based image segmentation include prostate cancer (Liu et al., "Prostate Cancer Diagnosis using Deep Learning with 3D Multiparametric MRI" (*Proc. SPIE* 10134, *Medical Imaging* 2017: *Computer-Aided Diagnosis*, 1013428 (2017); arXiv:1703.04078), heart (Poudel, et al., "Recurrent Fully Convolutional Neural Networks for Multi-slice MRI Cardiac Segmentation", arXiv:1608.03974v1, 13 Aug. 2016; Tran, "A Fully Convolutional Neural Network for Cardiac Segmentation in Short-Axis MRI", arXiv: 1604.00494v3 27 Apr. 2017; Lieman-Sifry, et al., "FastVentricle: Cardiac Segmentation with ENet", arXiv:1704296v1 13 Apr. 2017), breast (Dalmis, et al., "Using deep learning to segment breast and fibroglandular tissue in MRI volumes", *Med Phys* 2017 February; 44(2): 533-546), and knee (Prasoon, et al., "Deep Feature Learning for Knee Cartilage Segmentation Using a Triplanar Convolutional Neural Network", MICCAI 2013, Part II, LNCS 8150, pp. 246-253, 2013). Each of the identified publications is incorporated herein by reference for purposes of descriptions of the state of the art for utilizing CNN techniques in medical, and particularly MR, image analysis.

Radiologists can easily disagree on the segmentation or diagnosis called for by an MRI. Deep learning models may be able to deal with random variability in ground truth labels, but any systemic bias in radiology will persist in deep learning models trained on radiologists' predictions. Further, while much work has been done in the application of CNNs to MRI analysis, the issues and goals of segmentation within a static MRI slice are distinct from those involved in the analysis of sequences of frames having both spatial and temporal, or other series, characteristics that are fundamental to improving the reliability of selection of a specific frame within the series, for example, the $TI_{NP}$ for myocardial MRI, or selection of a slice within a stack of images for localization of anatomical features. The problem of selection of $TI_{NP}$ or slice localization is analogous to finding a needle in a haystack. With the application of deep learning, the problem of selecting a particular frame can be converted into a balanced classification problem that is well suited to an automated selection process.

BRIEF SUMMARY

The basic problem to which the inventive method is addressed is that of finding a single optimal image within a sequence of images, where the series may be a time sequence of images or a stack or collection of images, e.g., multiple image planes. The challenge of automating the selection process, as would be desirable for improving reliability and repeatability, arises from the fact that selection of the optimal image from within a batch of similar images is an unbalanced classification problem—a problem not well suited for machine learning. The inventive approach separates the series of images into two groups: those occurring before a particular point and those occurring after that point, where the point may be a point in time or an image located somewhere within the middle portion of the sequence. By defining the selection process as a two class problem, it enables application of a deep learning approach for solution of a balanced classification problem.

According to embodiments of the invention, a method is provided for automated selection of an optimal frame within a time series or other collection of image frames using an ensemble convolutional neural network (CNN) model. With an input consisting of a set of sequential image frames, the "frame set", a sliding window approach is used to define subsets of image frames within the frame set. The subsets are processed using a known CNN image classifier, specifically, a VGG classifier, to identify spatial features within the image set that allow separation of the subsets into classes corresponding to "before" and "after" the point that corresponds to the position of the optimal image within the frame same. The same input is provided to one or more long short-term memory (LSTM) models, which serve as layers of a recurrent neural network (RNN) to learn temporal features and dependencies within the sequence of image frames, i.e., serial features. The results of the CNN analysis are concatenated with those of the LSTM-RNN. The results of this analysis may be used for the evaluation of dynamic temporal activities and/or series for object recognition within images generated by, for example, MR and CT scans. In application to medical images, the inventive approach may be used to localize key anatomic landmarks that define imaging planes. Deep learning based localizations of these landmarks are believed to be sufficient to accurately prescribe the desired imaging planes.

The inventive approach of combining spatial and temporal analyses for automated image selection is applicable to many different types of image sequences. The illustrative examples described herein relate to medical image analysis, and more particularly to analysis of a series of images generated using magnetic resonance imaging, to aid in selection of an optimal image.

A method for identification of an optimal image within a sequence of image frames includes inputting the sequence of images into a computer processor configured for executing a plurality of neural networks and applying a sliding window to the image sequence to identify a plurality of image frame windows. The image frame windows are processed using a first neural network trained to classify the image frames according to identified spatial features. The image frame windows are also processed using a second neural network trained to classify the image frames according to identified serial features. The results of each classification are concatenated to separate each of the image frame windows into one of two classes, one class containing the optimal image. An output is generated to display image frame windows classification as including the optimal image.

In one aspect of the invention, a method for identification of an optimal image within a sequence of image frames includes inputting the sequence of image frames into a computer processor configured for executing a plurality of neural networks; applying a sliding window to the sequence of image frames to identify a plurality of image frame windows within the sequence; processing the plurality of image frame windows using a first neural network of the plurality, the first neural network trained for identifying spatial features within the image frames for first classifying the image frame window into spatial classes according to the identified spatial features; processing the plurality of image frame windows using a second neural network of the plurality, the second neural network trained for identifying serial features among the image frames for second classifying the image frame windows into series classes according to the identified serial features; concatenating the results of the first classifying and second classifying to separate each of the plurality of image frame windows into one of two classes, wherein image frame windows that include the optimal image are classified into one of the classes; and generating an output displaying image frame windows that include the optimal image.

In some embodiments, the sequence of image frames is MRI time sequence and the serial features comprise time. The MRI time sequence may be T1 mapping sequence. In other embodiments, the sequence of image frames is a stack of MRI slices and the serial features comprise location within the stack. The first neural network may be a convolutional neural network (CNN), more particularly a VGG19 network. The second neural network may be a recurrent neural network (RNN). more particularly long short-term memory (LSTM) models. The LSTM models may be in the form of a three serial bidirectional LSTM.

In another aspect of the invention, a method for identification of an optimal image within a sequence of image frames includes inputting the sequence of image frames into a computer processor configured for executing a plurality of neural networks; applying a sliding window to the sequence of image frames to identify a plurality of image frame windows within the sequence; processing the plurality of image frame windows using a convolutional neural network (CNN), the CNN trained for identifying spatial features within the image frames for first classifying the image frame window into spatial classes according to the identified spatial features; processing the plurality of image frame windows using a recurrent neural network (RNN), the RNN trained for identifying serial features among the image frames for second classifying the image frame windows into series classes according to the identified serial features; concatenating the outputs of the CNN and the RNN to separate each of the plurality of image frame windows into one of two classes, wherein image frame windows that include the optimal image are classified into one of the classes; and generating an output displaying image frame windows that include the optimal image.

In some embodiments, the sequence of image frames is MRI time sequence and the serial features comprise time. The MRI time sequence may be T1 mapping sequence. In other embodiments, the sequence of image frames is a stack of MRI slices and the serial features comprise location within the stack. The first neural network may be a convolutional neural network (CNN), more particularly a VGG19 network. The second neural network may be a recurrent neural network (RNN). more particularly long short-term memory (LSTM) models. The LSTM models may be in the form of a three serial bidirectional LSTM.

In a first exemplary implementation, the ensemble CNN model uses spatial and temporal imaging characteristics from an inversion recovery scout to select $TI_{NP}$ for DE-CMR imaging without the aid of a human observer. Using the inventive approach, ensembling the spatial features from CNN and temporal features from LSTM provides a comprehensive set of feature maps to optimally select the null point from an inversion time scout sequence. The inventive approach includes a VGG Net image classifier ensembled with a LSTM Long Short-Term Memory (LSTM) network to merge the spatial and temporal analysis capabilities of the two models.

In a second exemplary implementation, the ensemble CNN model is used to select a single slice from a series of MRI slices to identify the optimal mitral valve slice. Additional applications of the inventive model include finding the optimal frequency offset from a frequency scout series (a time series problem), and finding the optimal timing delay for magnetic resonance angiography or CT angiography (time series).

The VGG Net classifier, developed by Simonyan and Zisserman at the University of Oxford Visual Geometry Group (see Simonyan and Zisserman, supra) includes models with different depths (weight layers) ranging from 11 to 19 for large-scale image classification. In the exemplary implementation, the 19-layer model, referred to as "VGG19", was employed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 11 is a table listing the hyperparameters and details of each of the deep neural networks used in embodiments of the invention.

DETAILED DESCRIPTION OF EMBODIMENTS

Figure 1:
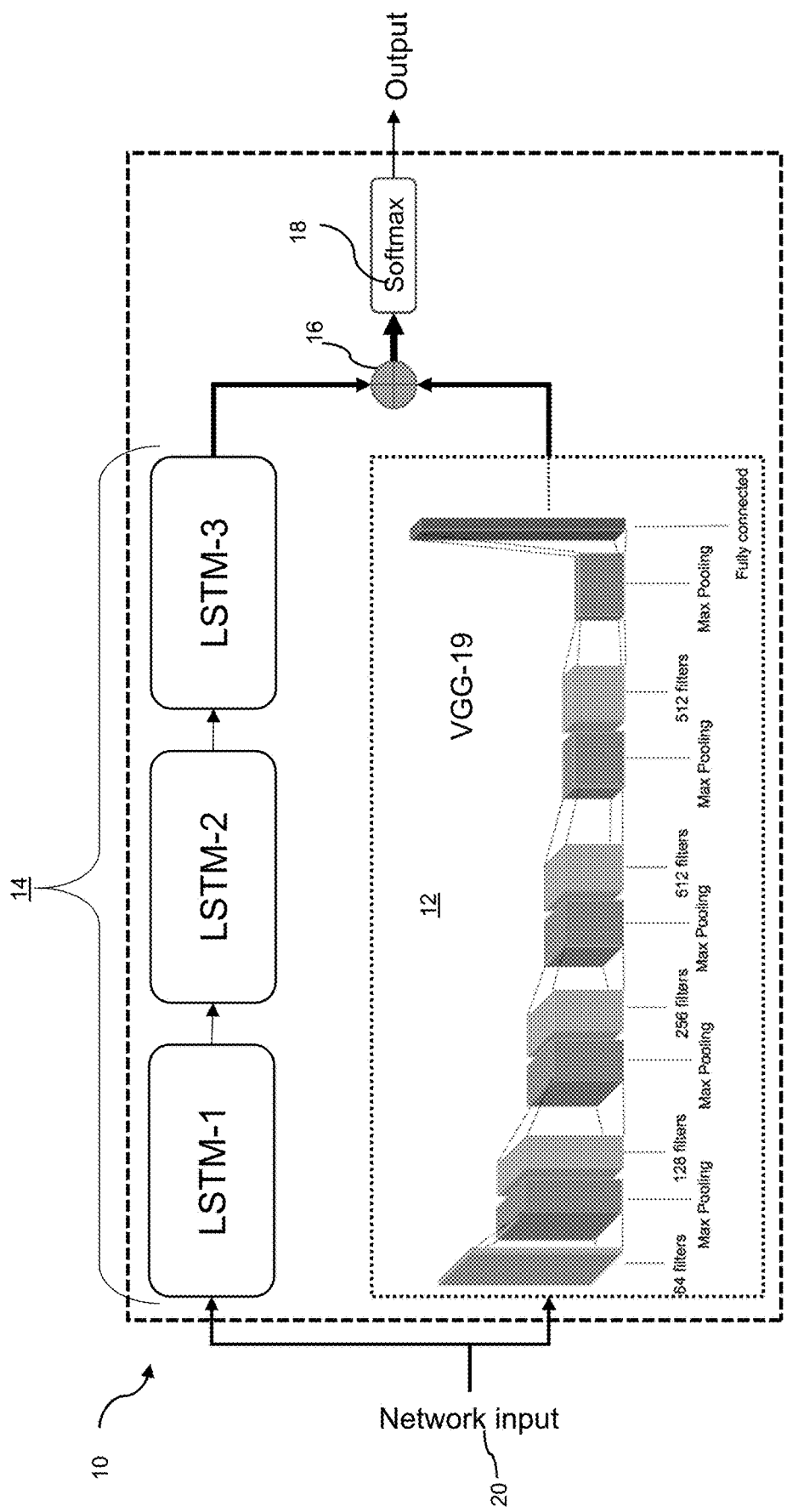
FIG. 1. is a diagrammatic view of an ensemble network architecture according to an embodiment of the invention.

As shown in FIG. 1, the network architecture 10 for the ensemble classifier according to an embodiment of the invention includes a VGG19 classifier 12, a convolutional neural network (CNN) with the primary function of capturing relevant spatial features, ensembled with a LSTM block 14, a recurrent neural network (RNN), to extract the most efficient and related spatial and temporal or serial features from a time series or other series of image frames provided as input 20 to the network 10. The VGG19 classifier 12 used in the network is well known in the art as described by Simonyan and Zisserman, supra. The results of the VGG19 classifier 12 and LSTM block 14 are concatenated at integrator 16, then passed through a softmax classification (regression) layer 18 for squashing the classification results into an appropriate range for output. Additional details of the network 10 are provided in the examples described below.

Figure 17:
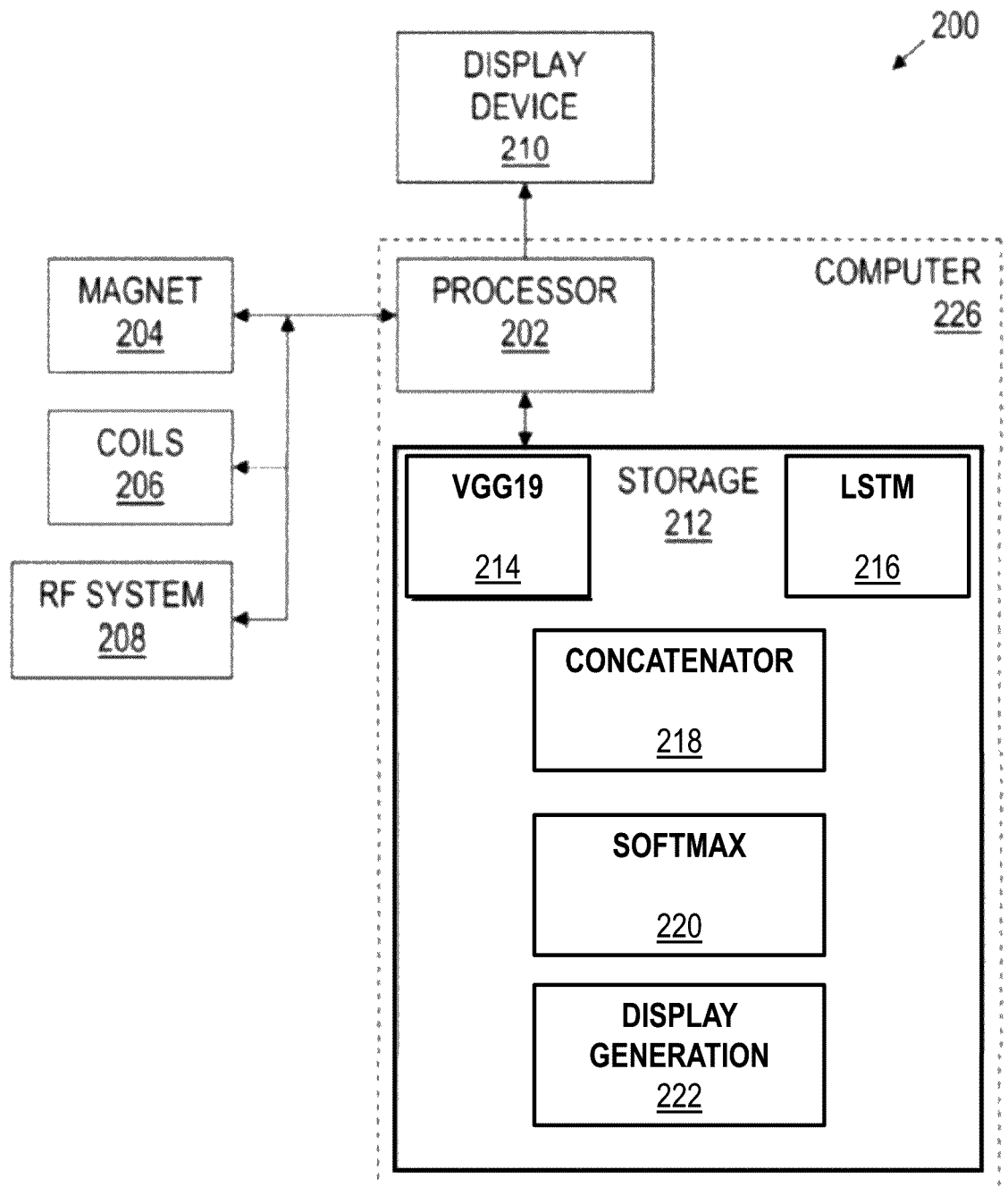
FIG. 17 is a block diagram of an exemplary imaging system in accordance with various embodiments of the invention.

FIG. 17 is a block diagram of an exemplary magnetic resonance (MR) imaging system 200 in accordance with various embodiments. The system 200 includes a main magnet 204 to polarize the sample/subject/patient; shim coils 206 for correcting inhomogeneities in the main magnetic field; gradient coils 206 to localize the MR signal; a radio frequency (RF) system 208 which excites the sample/subject/patient and detects the resulting MR signal; and one or more computers 226 to control the aforementioned system components.

A computer 226 of the imaging system 200 comprises a processor 202 and storage 212. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. In the examples described herein, a GPU workstation running Ubuntu 16.04, equipped with a NVIDIA Titan X GPU with Pascal architecture was used. The storage 212 includes a computer-readable storage medium.

Software programming executable by the processor 202 may be stored in the storage 212. More specifically, the storage 212 includes software modules comprising instructions that, when executed by the processor 202, cause the processor 202 to acquire magnetic resonance (MRI) data in the region of interest ("ROI") and process it using a spatial classification module (VGG19 module 214) and a temporal/sequential classification module (LSTM module 216); combine the results of the spatial and temporal/sequential classifications (concatenator module 218); remove redundancies (Softmax module 220) and to generate graphical images for display (module 222), e.g., on display device 210, which may be any device suitable for displaying graphic data. More particularly, the software instructions stored in the storage 212 cause the processor 202 to display the identified optimal frame, possibly along with additional supporting information, based on the classifications performed by the ensemble classifier.

Additionally, the software instructions stored in the storage 212 may cause the processor 202 to perform various other operations described herein. In some cases, one or more of the modules may be executed using a second computer of the imaging system. (Even if the second computer is not originally or initially part of the imaging system 200, it is considered in the context of this disclosure as part of the imaging system 200.) In this disclosure, the computers of the imaging system 200 are interconnected and configured to communicate with one another and perform tasks in an integrated manner. For example, each computer is provided access the other's storage.

Example 1: $TI_{NP}$ Selection for DE-CMR

With HIPAA compliance and IRB approval with institutional waiver informed consent, we retrospectively collected 425 clinically-acquired cardiac MRI exams performed 1.5T from 2012 to 2017 (age: 12-88 years, 157 female and 268 male). Table 1 below summarizes the patient demographic for this study.

TABLE 1

| Subjects | | |
|---|---|---|
| Gender | Male | 268 |
| | Female | 157 |
| Age | | 12-88 (average: 46) |
| Indications | Myocardial scar/viability | 119 |
| | Amyloid | 10 |
| | Hypertrophic cardiomyopathy | 30 |
| | Other cardiomyopathy | 100 |
| | Mass | 54 |
| | Congenital heart disease | 9 |
| | Pericardial disease | 13 |
| | Myocarditis/Sarcoid | 34 |
| | Others | 56 |

The MRI data included inversion recovery scout acquisitions eight minutes after the administration of gadolinium-based intravenous contrast. For all subjects, 0.3 mL/kg (0.3 mmol/kg) of gadobenate dimeglumine was administered. The inversion recovery (Cine IR, GE Healthcare) scout sequence captures image contrast evolution at multiple time points following an inversion pulse, and is typically used to identify the optimal inversion time for myocardial delayed enhancement (MDE) imaging. It should be noted that other inversion time mapping sequences or scout sequences as are known in the art may be used, including the TI scout (Siemens Medical), Look-Locker/MOLLI, or other myocardial T1 mapping sequences. The inversion recovery scout contained 30 frames with flip angle=10, Matrix=128×128, slice thickness=8 mm, repetition time=4.5 ms, and echo time=2.0 ms, acquired with a temporal resolution of 24-36 ms and inversion recovery range of 130-425 ms.

For ground-truth annotation, a radiology resident was trained to visually select the image in the sequence corresponding to the optimal myocardial inversion time ($TI_{NP}$) by a board-certified cardiac radiologist with ten years of experience in cardiac MRI. Due to the frequent occurrence of suboptimal TINT selection in clinical exams, we elected to use the more reliable reference standard of dedicated radiologist-supervised annotation of the Cine IR images rather than the selected inversion time of the myocardial delayed enhancement images. $TI_{NP}$ was marked on all available inversion recovery scout sequences as the time point where the myocardium had the lowest homogeneous signal intensity, after resolution of inversion artifact. In the examples illustrates in FIGS. 6-8, the frame corresponding to the expert-identified $TI_{NP}$ is indicated with an asterisk.

Figure 2:
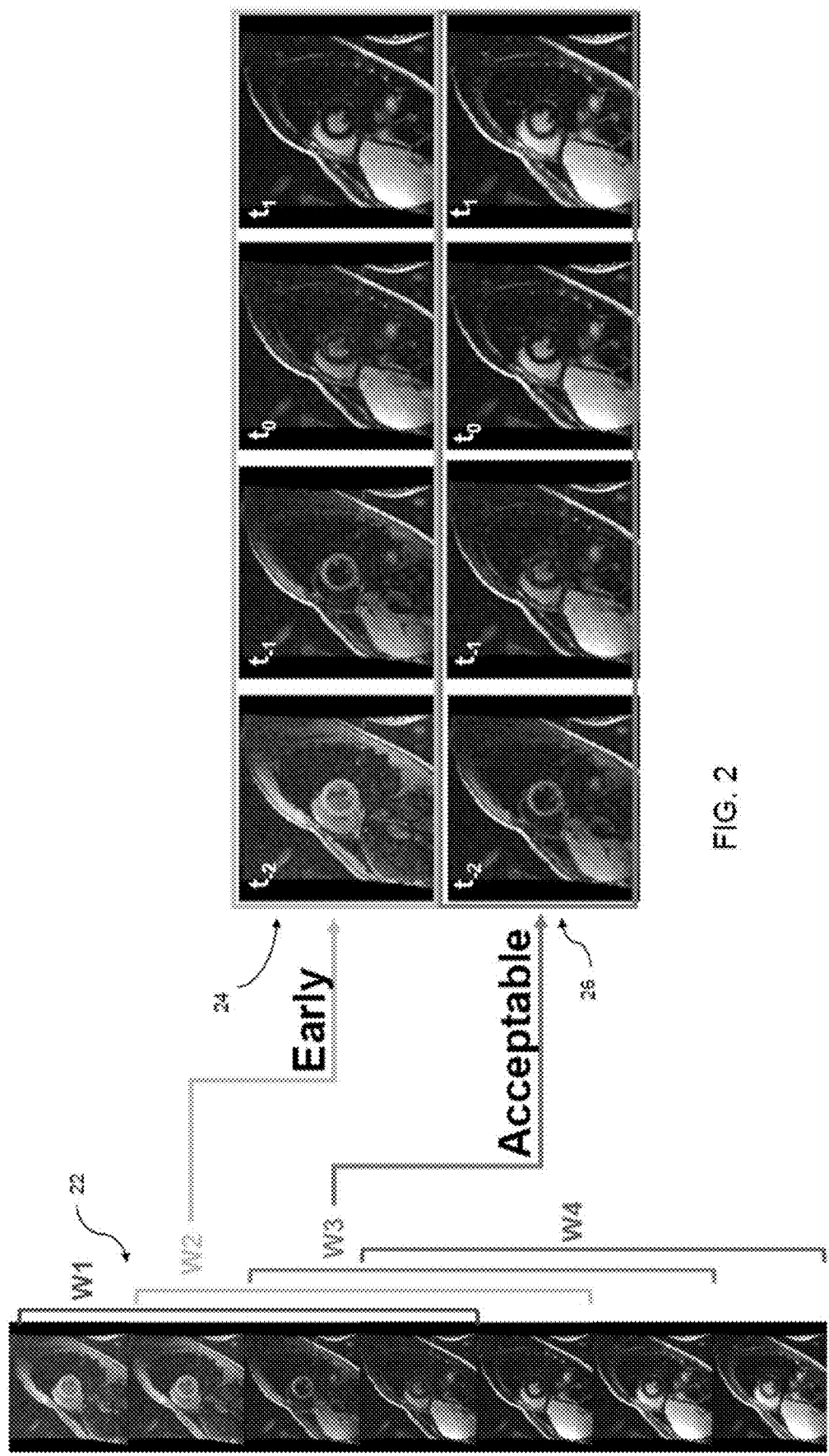
FIG. 2 illustrates a sample inversion time selection problem as a time window classification task.

While it may be tempting to dichotomize the problem of selecting a single optimal inversion time in a Cine IR series as a classification task to identify a solitary frame from a series of time frames, we instead posed the problem as a balanced two-class classification problem, classifying frames before the optimal inversion time as "early" and those at or following the optimal inversion time as "acceptable." Image frames before the ground-truth TINT, were considered "early" and image frames at or beyond $TI_{NP}$ were considered "acceptable". This more balanced two-class formulation is more tractable for a neural network. In addition, since the temporal context of each frame could be helpful for identifying the optimal inversion time, we implemented a sliding window approach where multiple windows, each consisting of four consecutive frames, are shown simultaneously to the neural network. Referring to FIG. 2, in panel 22 on the left, seven frames from an inversion-recovery scout sequence are shown. On the right are two example windows, labeled as "early" 24 or "acceptable" 26, each with four frames. To simulate a radiologist's perception and process for selecting an optimal inversion time, each window was assigned a class based on its third frame, so that two frames preceding and one frame following the frame of interest could provide context. The top, "early", window 24 is labeled as such because the third frame occurs before the optimal myocardial inversion time. The bottom, "acceptable", window 26 is labeled as such because the third frame occurs at or after the optimal myocardial inversion time. In other words, the input data window spanned four image frames, including the frame of interest ($t_0$), two preceding ($t_{-2}$, $t_{-1}$) and one following ($t_1$). Formulating the problem in this way, the third image of the first acceptable window in a given time series can then be marked as optimal inversion time ($TI_{NP}$).

The network architecture of FIG. 1 was used to extract the most efficient and related spatial and temporal features on the cMRI inversion recovery scout. The inventive approach employs a novel formulation of the inversion time selection problem as a time window classification task. This model concatenates the features captured by CNN 12 and LSTM-RNN 14 blocks to classify windows as "early" or "acceptable" to identify the frame corresponding to the optimal myocardial inversion time (TI) or null point ($TI_{NP}$).

We first constructed a four channel VGG19 network, where a sliding window of four consecutive frames was used as the network input. This model included five blocks of convolutional layers, which are shown in VGG19 block 12 in FIG. 1, in order, as 64 filters, 128 filters, 256 filters, 512 filters, and 512 filters, each followed by max pooling, and a fully connected layer as the final layer. The VGG19 classifier was trained in the Keras API environment with a TensorFlow backend. The initial hyperparameters of this network were set with a learning rate of $10^{-3}$, momentum of 0.9, kernel size of 21 in the first block and 3 on the rest, decay=$10^{-4}$ of the learning rates, using stochastic gradient descent (SGD) as the optimizer, with shuffling of the data. These five blocks were able to create 1024 deep features for each individual input. The spatial characteristics of the individual images were extracted by VGG19, however, the temporal relationships between frames were not integrated into the VGG19 model training.

A recurrent neural network (RNN) to address the temporal relationship between image frames employed LSTM. The LSTM model included 16 filters, with 2D kernel size of 3. We maintained the image size to be 256×256 with the embedding dimensions of 128. Three serial Bidirectional LSTMs (14 in FIG. 1) (Keras LSTM model) with return sequence were implemented to capture forward and backward relationships across the frames. This model was used to classify the windows containing four (4) frames into two classes: "early" and "acceptable". The third frame of each window defined the class. Use of LSTM alone was not adequate to incorporate all spatial and temporal characteristics in the scout.

Figure 3:
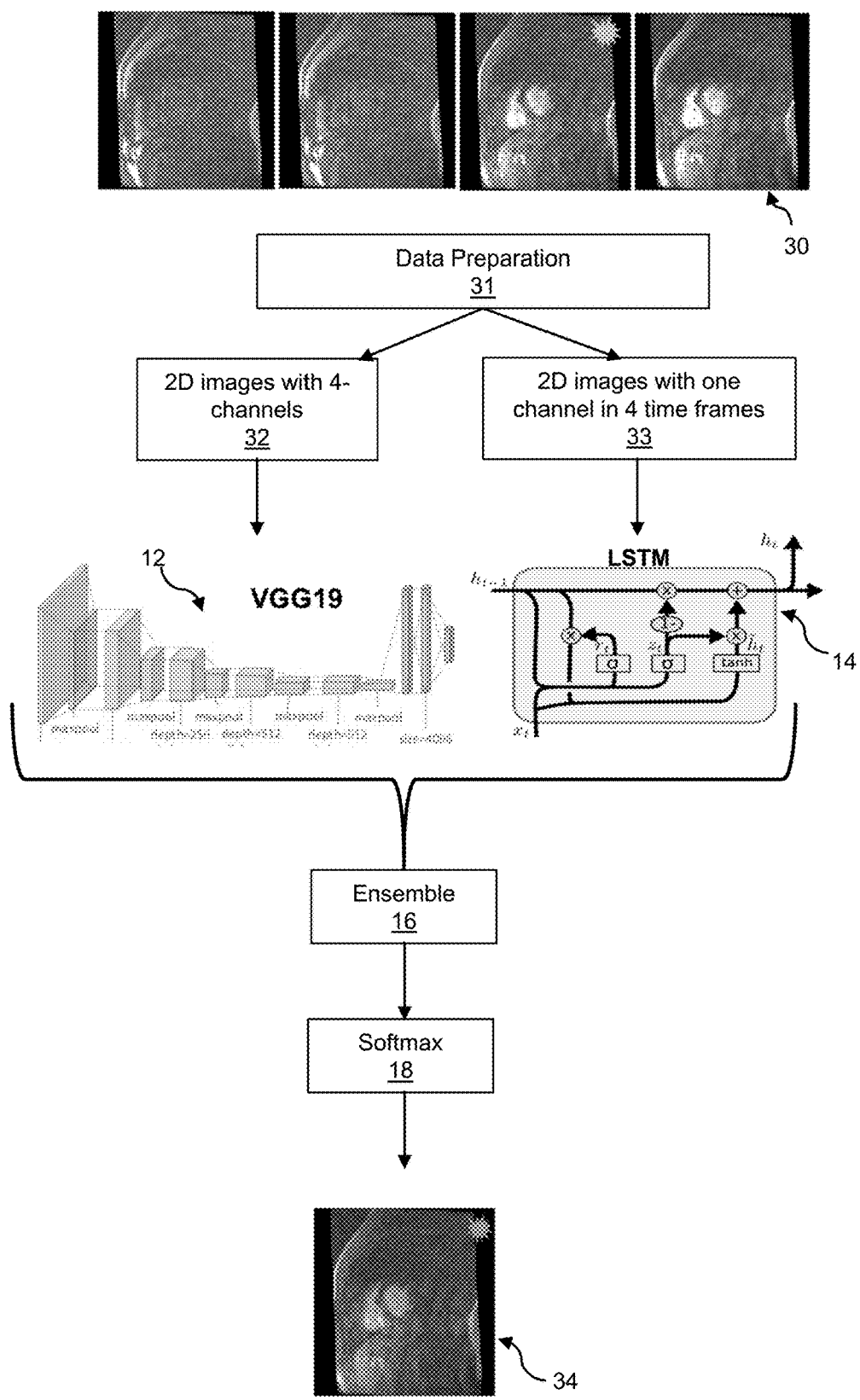
FIG. 3 is a flow diagram showing the process for inversion time prediction according to an embodiment of the invention.

Referring to FIG. 3, the ensemble classifier, referred to as "STEMI-Net", spatial features captured by the VGG19 network 12 were concatenated at integrator 16 to the temporal features obtained by the LSTM model 14 for each window 30 of consecutive frames 30. This data was input as 2D images with 4-channels (32) into VGG19 classifier 12 and as 2D images with one channel in four time frames (33) into LSTM model 14. Each network extracted 1024 features independently and concatenating these features (ensemble 16) generated a large number of parameters (n=2048). Two Dense layers (Softmax 18) were used to reduce the redundancies in the feature maps. We used 0.5 Dropout to increase the robustness of remaining features. Training error was minimized using SGD optimizer minimizing binary cross-entropy and was validated by classification accuracy. Training was performed over 50 epochs with batch size of 1. The model was trained on a GPU workstation running Ubuntu 16.04, equipped with a NVIDIA Titan X GPU with Pascal architecture. The output of STEMI-Net was the "early" and "acceptable" probabilities of a window of 4 frames, with the final result being the optimal image frame with the $TI_{NP}$ 34.

We first evaluated the relative performance of the VGG19, LSTM, and STEMI-Net neural networks for classifying each of the four-frame windows into "early" and "acceptable" categories. Table 2, which provides the five-fold cross-validation results for the individual models and the ensemble STEMI-Net, clearly shows the ensemble network exceeded the performance of either of its component networks.

TABLE 2

| Model | | Accuracy |
|---|---|---|
| VGG19 | | 83.9 ± 2.8% |
| LSTM | | 81.9 ± 3.2% |
| STEMI-NET | Fold 1 | 92.9% |
| | Fold 2 | 94.2% |
| | Fold 3 | 93.9% |
| | Fold 4 | 89.9% |
| | Fold 5 | 89.8% |
| | Total | 92.1 ± 2.1% |

Prediction of $TI_{NP}$ from the ensemble VGG19/LSTM closely matched with expert annotation (ρ=0.84). 100% of the predicted $TI_{NP}$ were within ±30 ms and 70% exactly matched expert inversion time selection.

Figure 4:
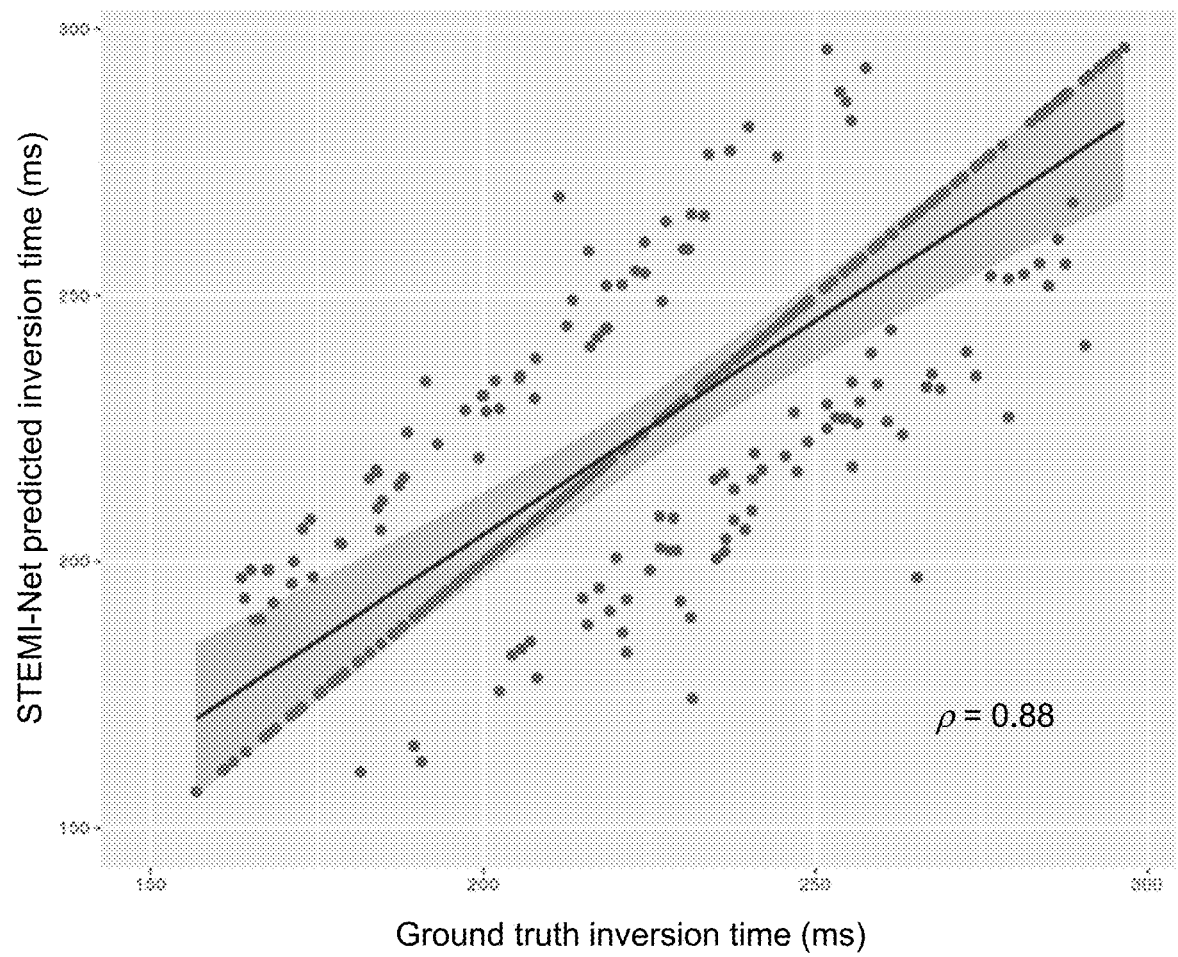
FIG. 4 is a scatterplot of STEMI-Net predictions versus ground truth inversion times of all cases using five-fold cross-validation.

To identify the null point from a given inversion recovery time series, all four-frame windows were classified by the neural network. As described above, we defined the third frame ($t_0$) of the first "acceptable" window as predicted $TI_{NP}$. Prediction of $TI_{NP}$ by STEMI-Net closely matched with expert annotation (ρ=0.88). STEMI-Net predicted the exact inversion recovery time as the ground truth for 63% of the patients (n=285). In 94% of cases (n=397), predictions of $TI_{NP}$ were within one frame (about 36 ms) of the ground truth. Further, in 83% of cases (n=352), the prediction occurred at or after the ground truth, suggesting that the neural network was largely able to choose inversion times at time points after inversion artifact. FIG. 4 illustrates the relationship between inversion times selected by STEMI-Net and ground truth for all cases using five-fold cross-validation. The shaded area depict the 99% confidence interval. 100% of the predictions were within 30 ms of the ground truth.

A saliency map, also known as an attention map, is a visual representation of salient regions, pixels, or objects in an image that are activated during a classification task. Inspection of saliency maps can help localize the spatial and temporal characteristics that a CNN uses to make the final classification into "early" and "acceptable" categories. Saliency maps were created based on backpropagation paradigm, decoding the most important features from the input image. Rectified linear unit (ReLU) was used as backpropagation modifier for saliency map visualization using the Keras Vis toolkit.

Figure 5A:
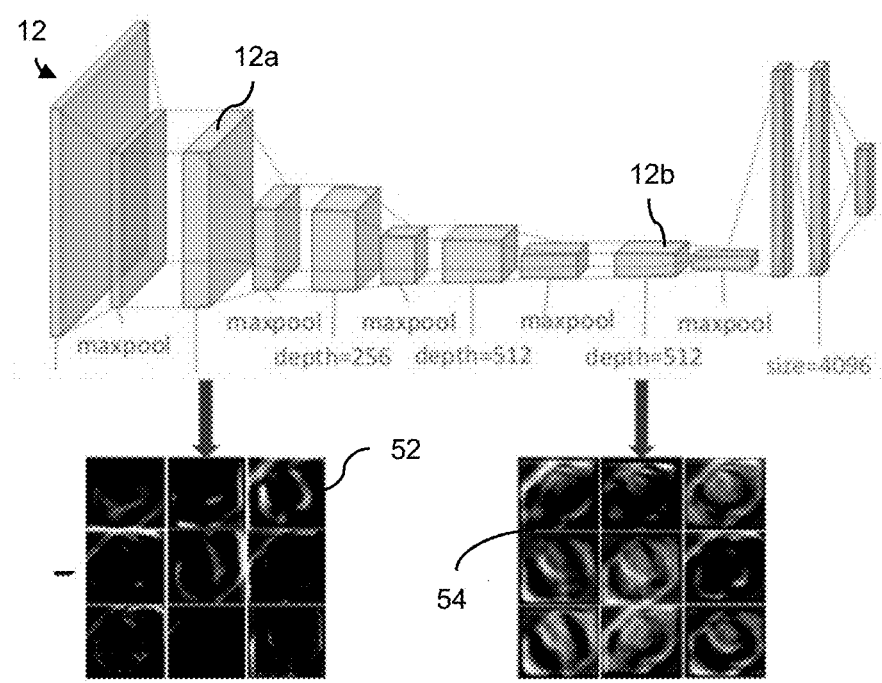
FIG. 5A is a diagrammatic view of the VGG19 network structure showing image features extracted in different blocks of the network.
Figure 5B:
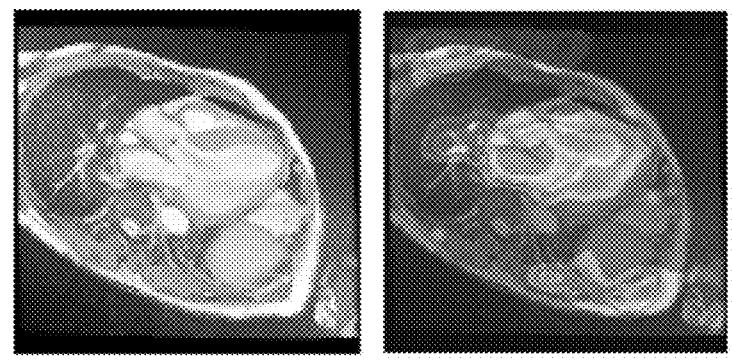
FIGS. 5B and 5C show image frames and corresponding saliency maps indicating locations of greater attention in the images.
Figure 5C:
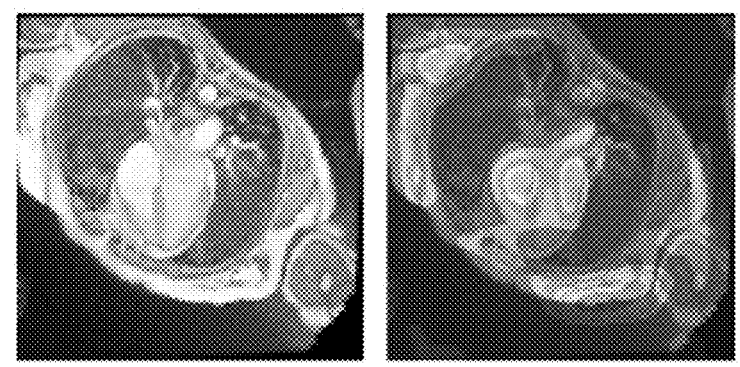

Saliency maps were created to better understand the behavior of the network during the classification task. To provide an example of the approach used, FIG. 5A shows the structure of VGG19 12 with image panel 52 indicating that the features extracted from a 4-ch long axis in the primary block 12a of VGG19 include edges and corners. Image panel 54, which shows the features extracted from the same image in the final block 12b of VGG19, contains the overall morphology of heart. FIG. 5B illustrates an example of a saliency map (right panel) of a 3-ch image (left panel) with greater attention to the left ventricular outflow tract. FIG. 5C illustrates an example of a saliency map (right panel) of a 4-ch image (left panel) with greater attention to the endocardial cushion and basal lateral wall.

Figure 6:
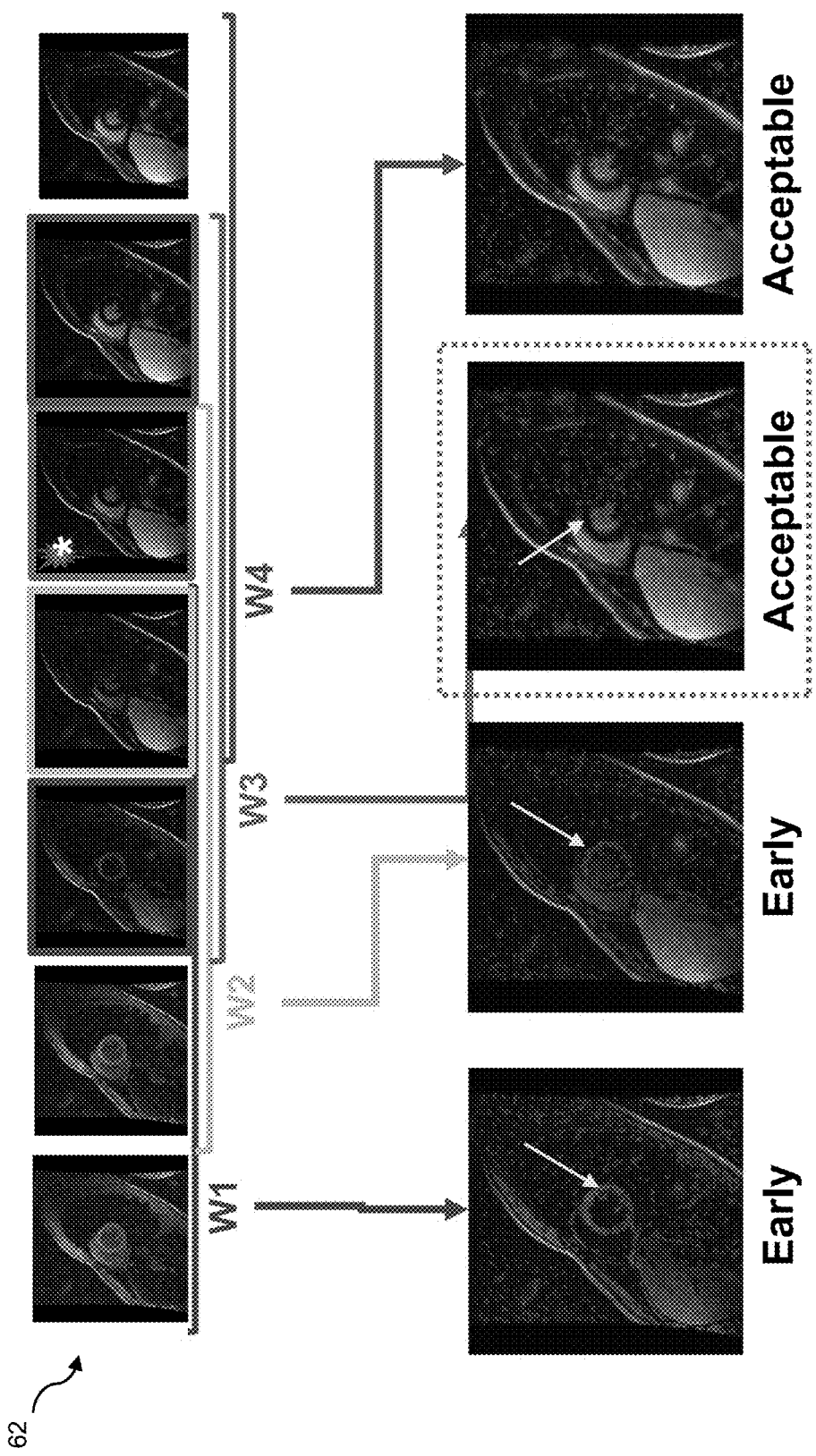
FIG. 6 shows source images from an inversion recovery scout sequence with saliency map overlays indicating areas of highest attention by the STEMI-Net neural network.
Figure 7:
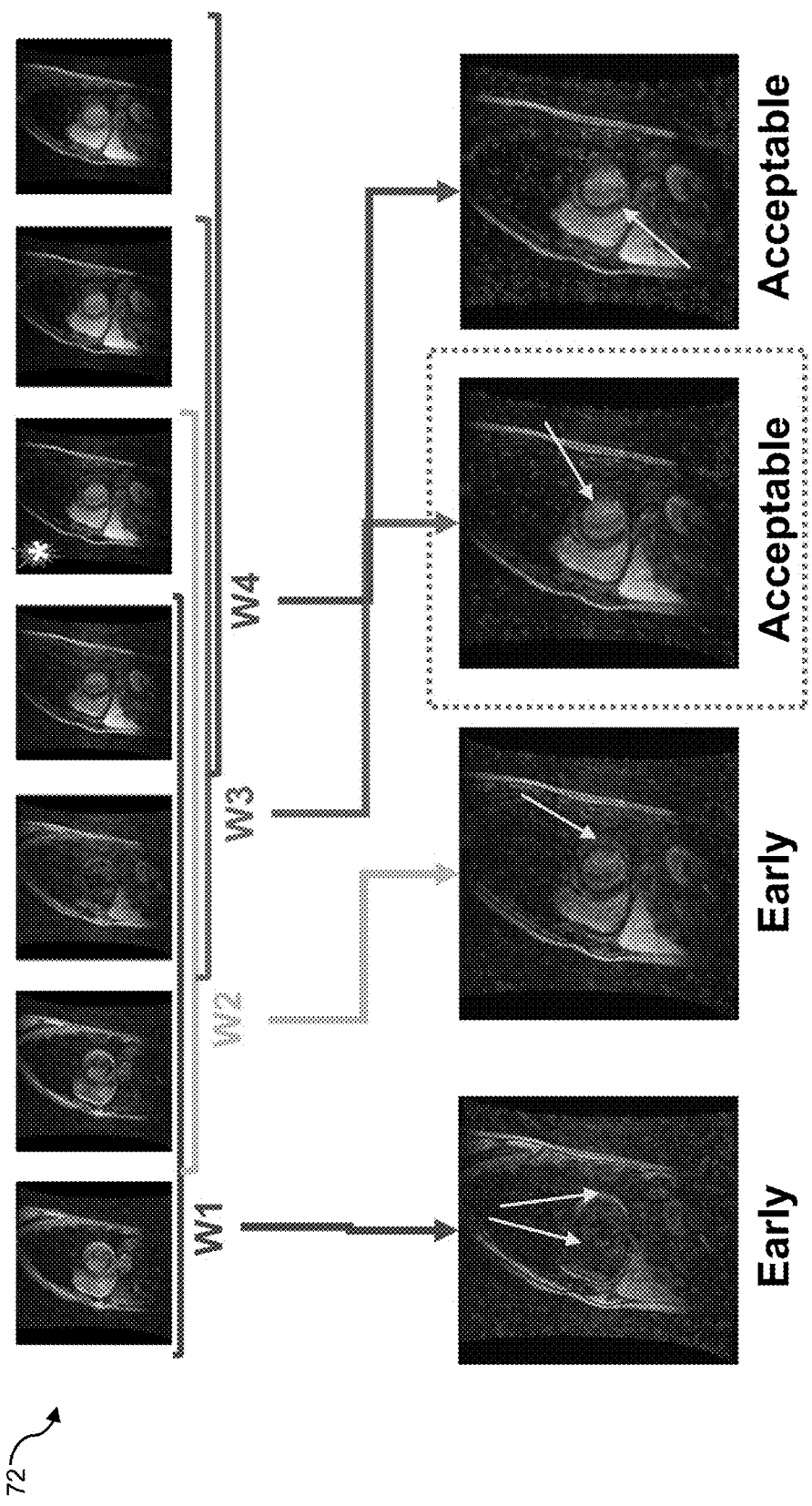
FIG. 7 shows source images from an inversion recovery scout sequence with myocardial delayed enhancement with saliency map overlays showing areas of highest attention by the STEMI-Net neural network.
Figure 8:
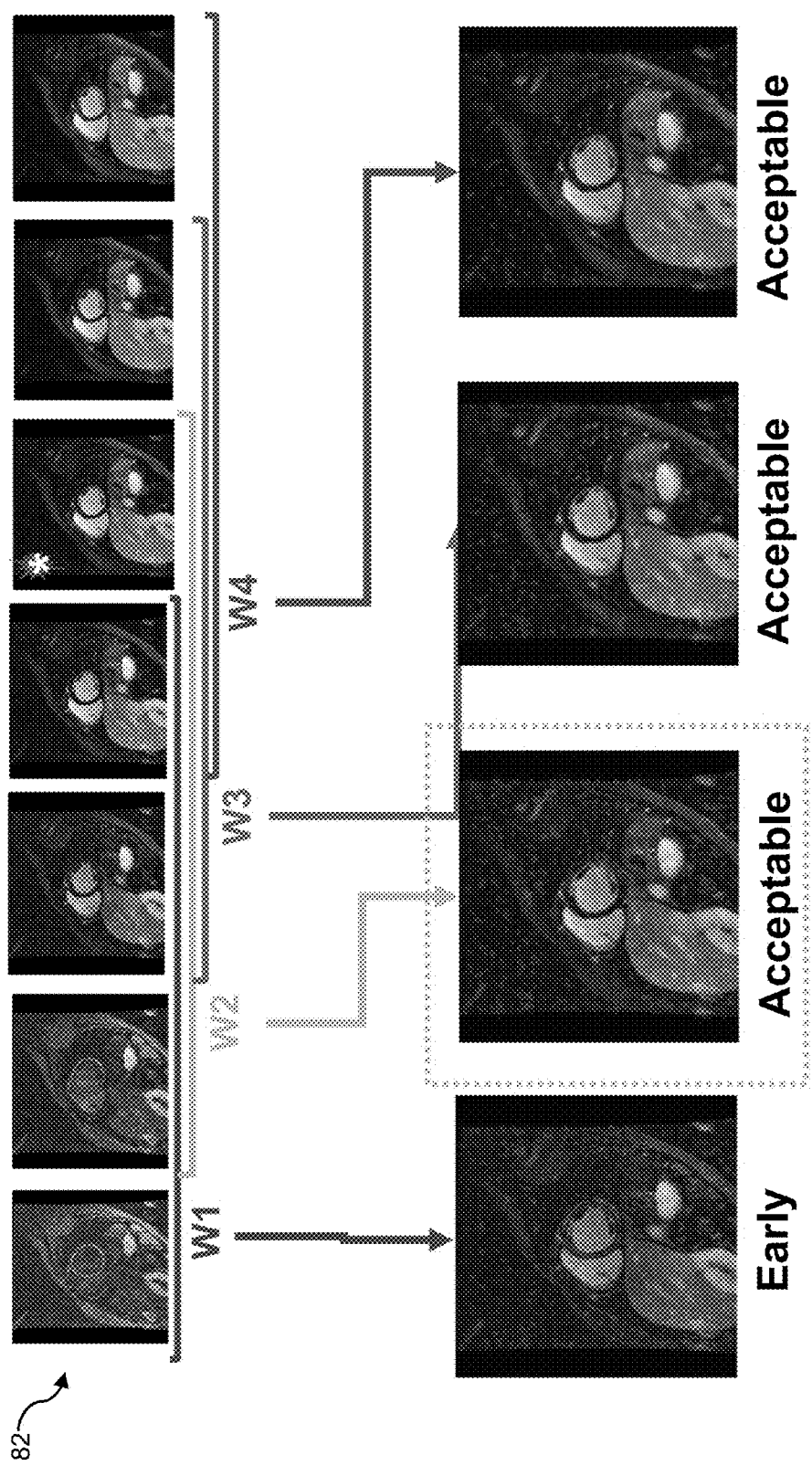
FIG. 8 provides an example of saliency maps with slight discordance between ground truth and STEMI-Net, with source images from an inversion recovery scout sequence and saliency map overlays showing areas of highest attention by the STEMI-Net neural network.

Saliency maps were generated for all windows in the validation dataset. These maps highlight the magnitude and location of features with greatest activation during the classification task. In FIGS. 6-8, the top rows are the source images from an inversion recovery scout sequence of seven frames. Four sliding windows within the scout sequence, labeled "W1" to "W4", are evaluated. In FIG. 6, for scout sequence 62, saliency map analysis on STEMI-Net revealed that the network attention focused primarily on myocardium and skeletal muscle on windows W1 and W2, which were ultimately classified as "early". Windows W3 and W4 were labeled as "acceptable." In the acceptable windows, the model detects different alterations spread out in the entire feature without any particular focus point or structure. Blood pools in left and right ventricles are slightly bright with a scatter pattern in the acceptable windows. FIG. 7 shows the saliency map for classification of a case with a scar in the myocardium using scout sequence 72, with myocardial delayed enhancement. In contrast to the results shown in FIG. 6, attention appears more diffuse for windows classified as "acceptable" ((W3 and W4) with slightly increased attention to the blood pool. In cases where myocardial scar was present, this pattern persisted. The neural network appears to ignore the area of myocardial scar in the septal wall when making the determination of an "early" time window. Instead, the classification of "early" windows W1 and W2 was performed with attention to segments of normal myocardium.

FIG. 8 provides an example of an early null point detection based on scout sequence 82. In the few cases where there was disagreement between STEMI-Net and the expert reader, the discrepancy appears to be due to a more accurate prediction by the neural network. In this example, STEMI-Net predicted the null point one frame earlier than the expert, thus labeling second window W2 as "acceptable." The saliency map is pointing to some parts of myocardium in window W2 as opposed to the entire myocardium similar to first window W1. Lack of attention to the myocardium whole structure, combined with some attention to the blood pools in left and right ventricles guide the model to identify the second window as "acceptable". However, the myocardium is very dark in both the fourth and fifth frames of scout sequence 82. Thus, both second and third windows W2 and W3 can be potentially marked as the first acceptable set. Arguably, STEMI-Net chose this frame correctly, and in retrospect the expert reader could have just as readily chosen the earlier time frame.

In this example, a CNN is demonstrated to be capable of automated prediction of myocardial inversion time from an inversion recovery experiment. Merging the spatial and temporal/sequential characteristics of the VGG-19 and LSTM CNN structures appears to be appropriate to accomplish this task in a manner comparable to an expert human observer. The STEMI-Net ensemble network was capable of predicting the inversion recovery null point by utilizing a time sequence of images from a TI scout acquisition by formulating the problem as a two-class classification task. In this example, the VGG19 component classified the "early"

and "acceptable" windows by using spatial features, while the LSTM component extracted temporal features. The combination of both increased classification and null point prediction. Furthermore, evaluation of the saliency maps of STEMI-Net confirms that the classification task is accomplished by monitoring the signal characteristics of the myocardium.

Evaluation of the behavior of neural network through saliency maps may be valuable to assess their generalizability beyond the training data set. In this example, we calculated saliency maps through backpropagation to localize features that contribute to the final prediction. Study of saliency maps showed that this model predicts correct frame classification based on signal characteristics of myocardium, skeletal muscle and blood pool. Based on these results, the inventive ensemble network appears to be robust, even in the presence of scar in the myocardium, and suggests potential clinical value when incorporated into clinical MRI protocols.

It is believed that STEMI-Net is the first application of deep learning to address selection of myocardial inversion time.

A few limitations of the example should be noted. In the training and validation of this model, training was restricted to short axis inversion recovery scout acquisitions. It is noted that some sites prefer four-chamber or other long-axis acquisitions for the inversion recovery scout sequence. Further, we included only training data from 1.5T scanners from a single vendor. Data acquired at higher field strength (e.g., 3T) and across different vendors may improve the generalizability of the model.

Example 2: Selection of Mitral Valve Slice

Figure 9:
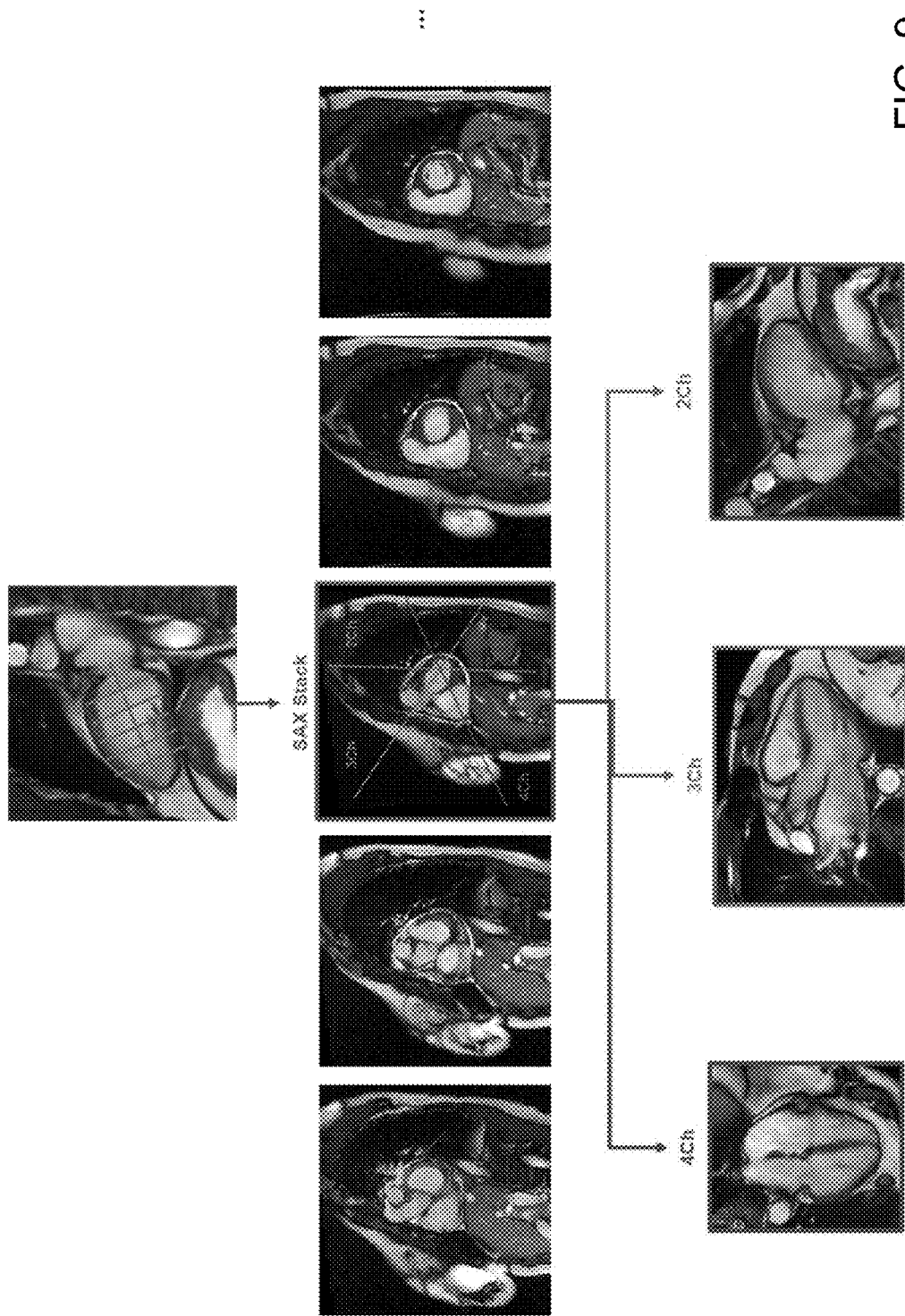
FIG. 9 illustrates a typical sequence of imaging planes obtained for cardiac MRI for use in embodiments of the invention.

With HIPAA compliance and IRB approval, we retrospectively collected 482 cardiac MRI studies performed on a 1.5T MRI scanner between February 2012 to June 2017. Within these studies there were 892 long-axis (LAX) cine SSFP series (including 257 4-chamber, 207 3-chamber, 197 2-chamber, and 231 other long-axis views) and 493 short-axis (SAX) cine SSFP series. Of these studies, 303 (62.86%) were male and 179 (37.14%) were female patients, with an age range from 12 to 90. A typical imaging protocol is shown in FIG. 9. Images are sequentially acquired. From an initial vertical long axis, a short axis stack is prescribed. From the short axis stack, the 4-chamber, 3-chamber and 2-chamber long axis views are prescribed.

A radiology resident was trained to identify and annotate cardiac landmarks on each MRI series. A board certified radiologist gave final approval of all ground truth annotations. LAX images were annotated for mitral valve (MV) and apex, while SAX stacks were annotated for aortic valve (AV), MV, pulmonic valve (PV), and tricuspid valve (TV).

Cine SSFP (steady state free precession) images were each acquired on a 1.5T MRI scanner—the same image set that was used in Example 1. The inversion recovery (Cine IR) scout sequence captures image contrast evolution at multiple time points following an inversion pulse, and is typically used to identify the optimal inversion time for myocardial delayed enhancement (MDE) imaging. Cine SSFP images were obtained with flip angle=10, matrix=128×128, slice thickness=8 mm, repetition time=4.5, and echo time=2.0, acquired with a temporal resolution of 24-36 ms [calculate with TR×(views/segment usually around 12-16)]. Short-axis stack images were acquired at 8-mm slice thickness with 10-mm intervals between slices.

Figure 10:
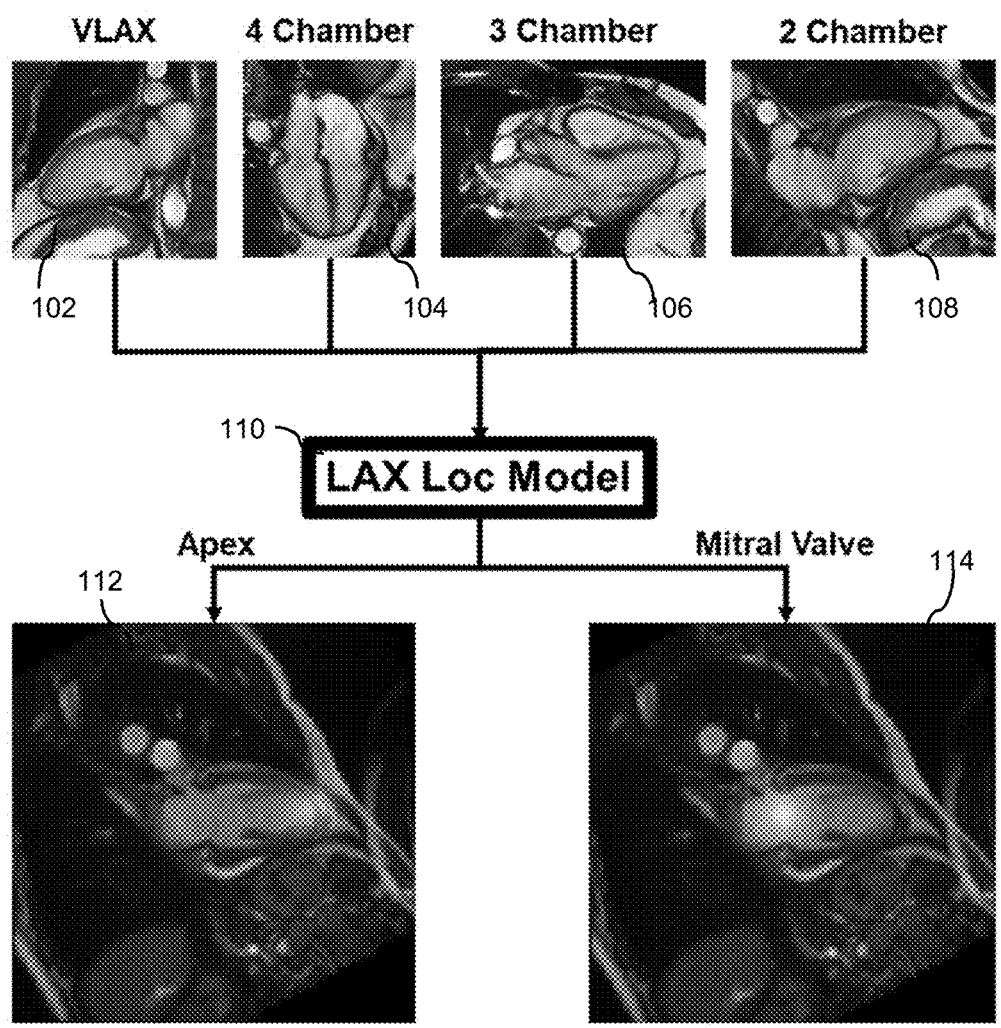
FIG. 10 shows data used to train the long-axis (LAX) localization model according to embodiments of the invention.

FIG. 10 shows the input data used to train the LAX model, where vertical long-axis (VLAX) 102, 4-chamber 104, 3-chamber 106, and 2-chamber 108 views were aggregated to train the long-axis model 110 for localization of the mitral valve (MV) 112 and apex 114. To localize the LAX landmarks (apex and MV), we implemented a 2D U-net modified for heatmap regression. The final convolutional layer was replaced with a linear activation and a kernel size of 1 using $L_2$ loss. Channel-by-channel isotropic gaussian heatmaps centered at each localization (representing probability densities of landmark localization) were created for the apex and MV. Hyperparameters for the LAX localization model are provided in the table shown in FIG. 11.

Landmark localizations were defined by the maximal index of the predicted heatmaps. To evaluate heatmap localization results, we compared ground truth expert annotation localizations to those predicted by deep learning. We performed all deep learning experiments using Keras with TensorFlow backend trained on a NVIDIA Titan Xp. Data was split into 80% for training and 20% for testing, with the results confirmed using 5-fold cross validation.

Figure 12:
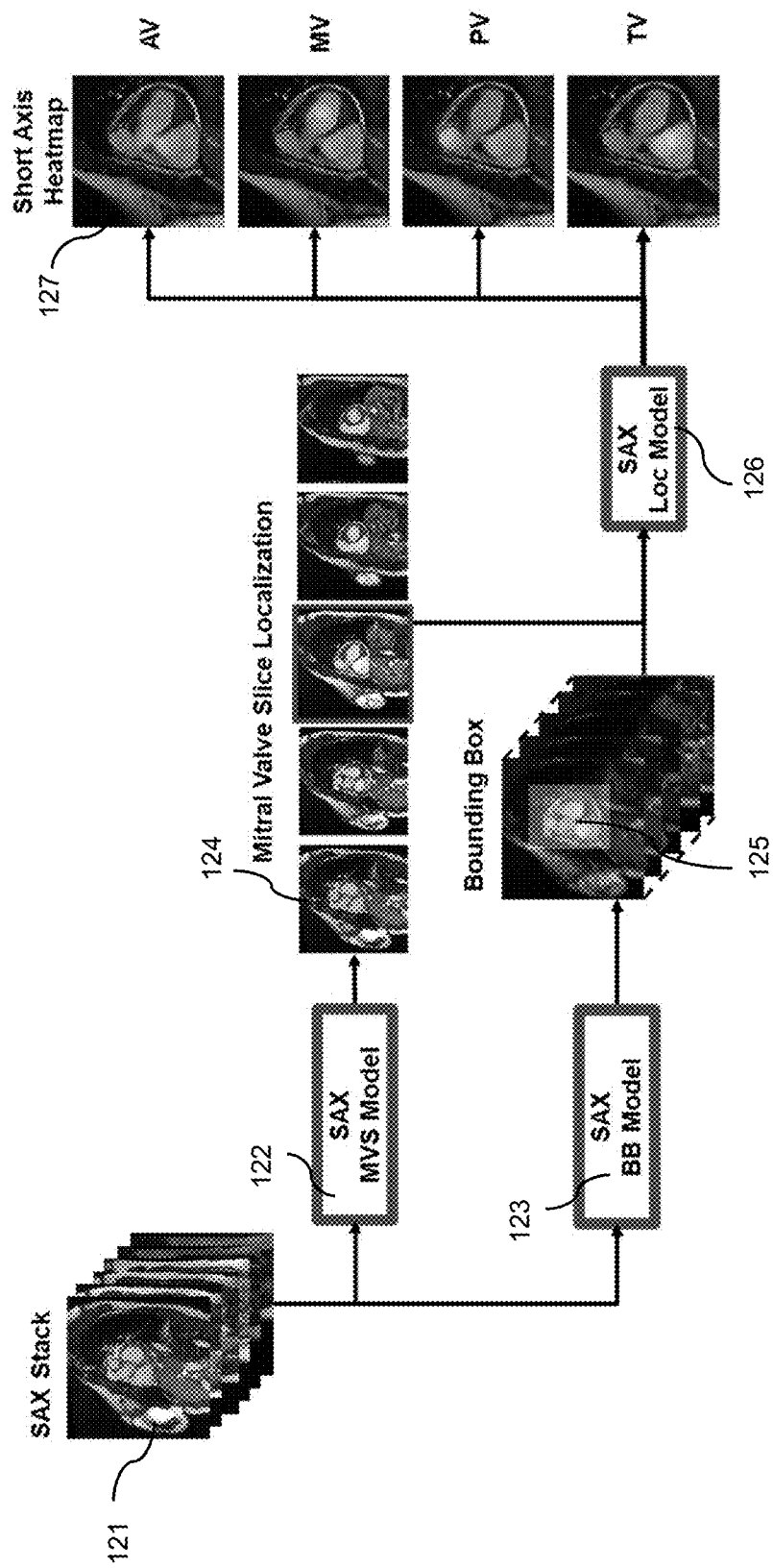
FIG. 12 illustrates the process for training short-axis (SAX) localization models.

To undertake three-dimensional localization of the key anatomic landmarks needed for 4-chamber, 3-chamber and 2-chamber plane prescription from a short-axis stack, we decomposed the problem into three stages, as shown in FIG. 12. First, we used short-axis stack images 121 to identify the mitral valve slice (MVS) 124 with a MVS localization model 122. Second, we used the bounding box (BB) model 123 on the short-axis stack images to create a bounding box around the heart to reduce the search space for the anatomic landmarks. Third, the slice localization 124 and bounding box 125 outputs were used to train a final localization network (short-axis model 126) for fine-grain anatomic localization (short axis heatmap 127) of the aortic valve (AV), mitral valve (MV), pulmonary valve (PV) and tricuspid valve (TV).

Figure 13:
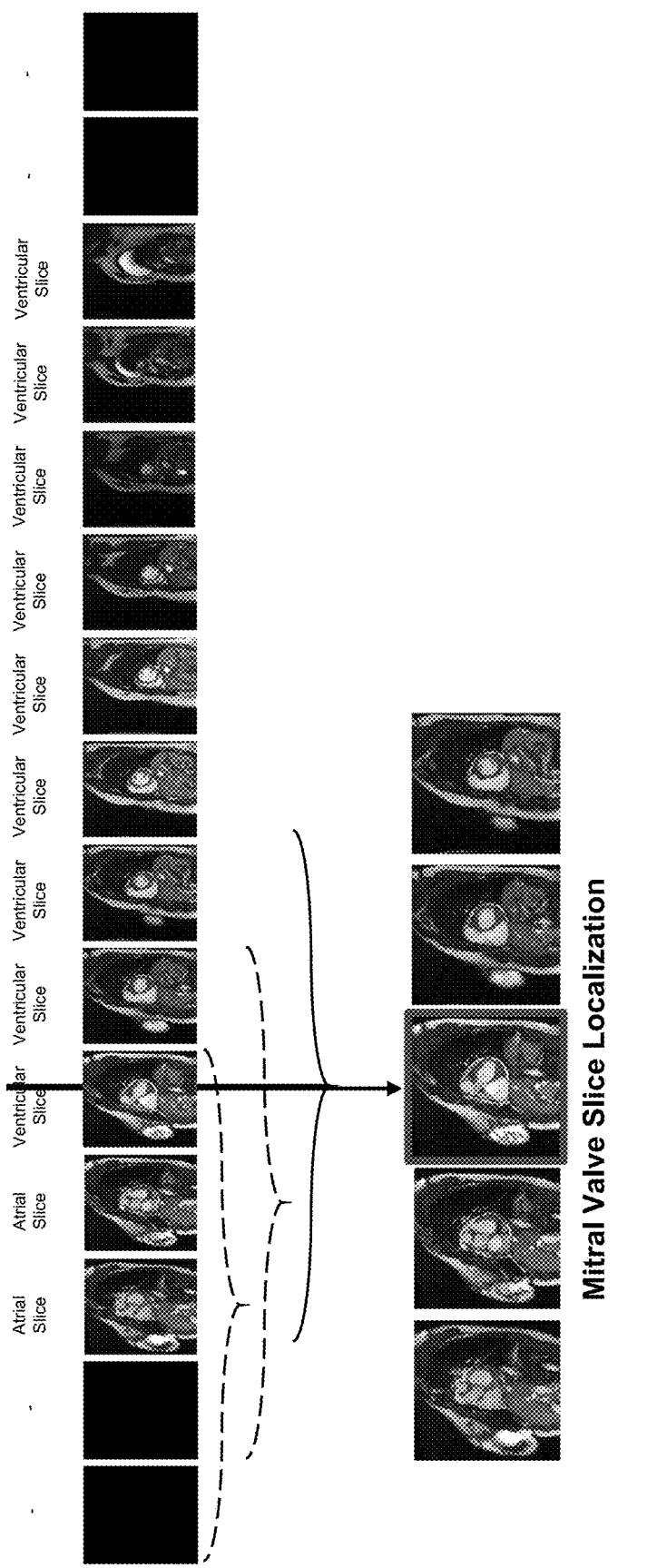
FIG. 13 shows an example of sliding window localization of a mitral valve slice using a CNN classifier according to an embodiment of the invention.

To identify the mitral valve slice (MVS), we utilized the above-described STEMI-Net, a 2.5D VGG-19/LSTM ensemble network, for MVS localization, redefining the localization task as a classification task, as shown in FIG. 13. The MVS model was trained to classify proposal slices as either "atrial" or "ventricular" to the ground truth labeled MVS. Spatial context was provided by adding two slices atrial and two slices ventricular to each target slice for a total of 5 channels. Within a given short-axis stack of images, the first ventricular slice in the sorted stack was marked as the predicted mitral valve slice.

To reduce the localization search space, we implemented a 2.5D U-net to perform a rough in-plane bounding box around the heart, using all slices of the short-axis stack. Bounding box labels were defined as by identifying the minimum rectangles that surround a 25-pixel in-plane border that encompassed the AV, MV, PV, and TV landmarks.

To achieve fine in-plane localization on the SAX stack, the outputs of the MVS model and bounding box model were combined as inputs. Using a similar approach as described above for LAX-localization, we implemented a 2.5D heatmap regression model for in-plane localization of SAX landmarks.

Cardiac MRI planes were prescribed according to the cardiac MRI protocol shown in FIG. 9. The SAX plane was defined between apex and MV, 4-chamber between TV and MV, 3-chamber between AV and MV, and the 2-chamber bisecting the 4 and 3 chamber view planes. Performance was assessed by calculating the angle difference between DL-predicted localizations (DL planes) and either expert annotation derived ground truth planes (GT planes), or the retrospectively identified plane prescribed by a technologist at the time of image acquisition.

Differences in localization error were compared using t-test in R (R Foundation for Statistical Computing, Vienna Austria). Mean angle bias and mean absolute angle differences are reported.

Figure 14A:
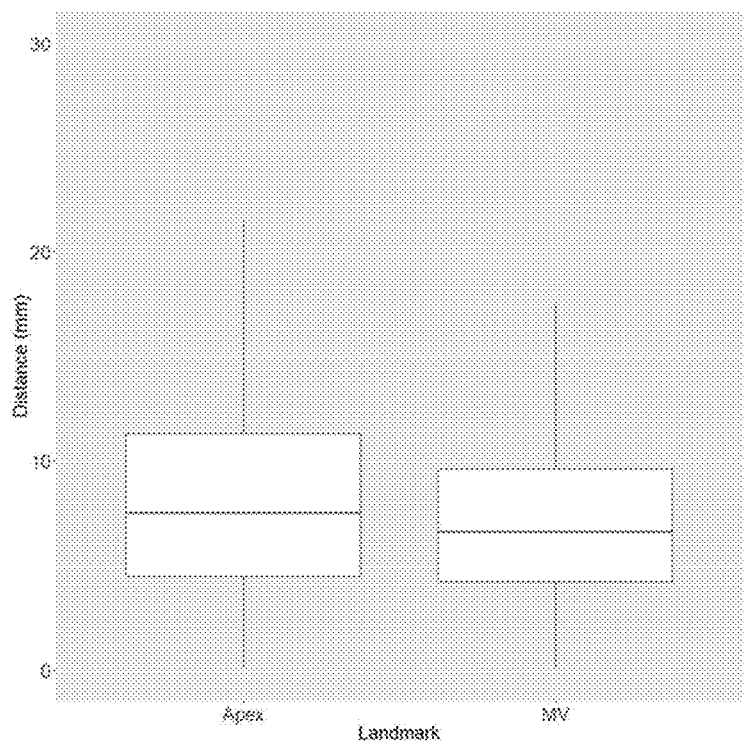
FIGS. 14A and 14B are plots of distances between predicted and ground truth for the long-axis (14A) and short-axis (14B) localization models.

To assess localization accuracy on long-axis images, we measured the distance between ground truth annotation and DL-predicted localizations. As shown in FIG. 14A, for LAX images, the mean DL localization was within 12.56±19.11 mm for apex and 7.69±6.91 mm for the MV. Given the importance of VLAX accuracy for subsequent derivation of the SAX stack, we examined the localizations for the VLAX. For VLAX images, mean predicted localizations were within 10.20±13.58 mm for the apex and 8.21±10.71 mm for MV.

Figure 15A:
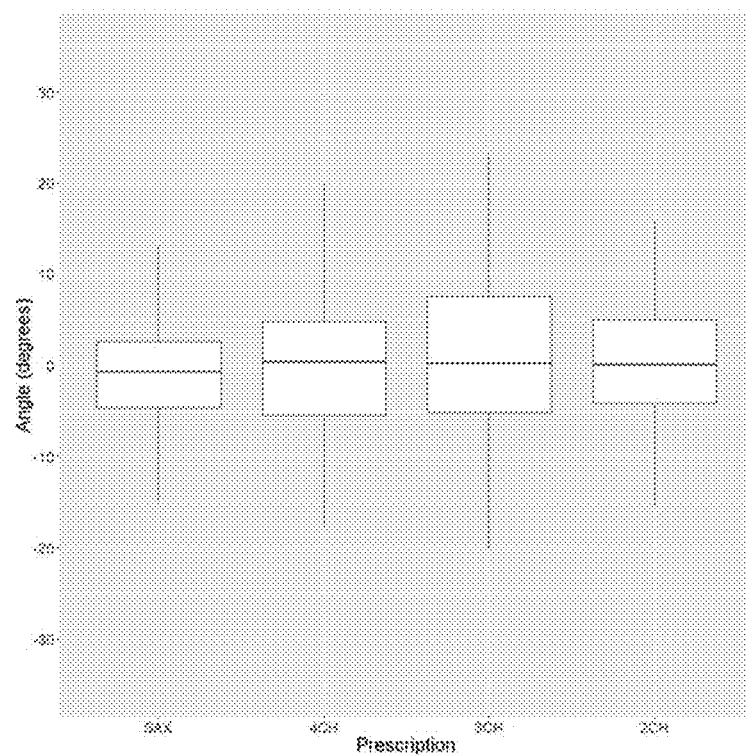
FIGS. 15A and 15B are plots comparing plane prescriptions against expert ground truth planes (15A) and retrospectively matched technologist planes used during examination (15B).
Figure 15B:
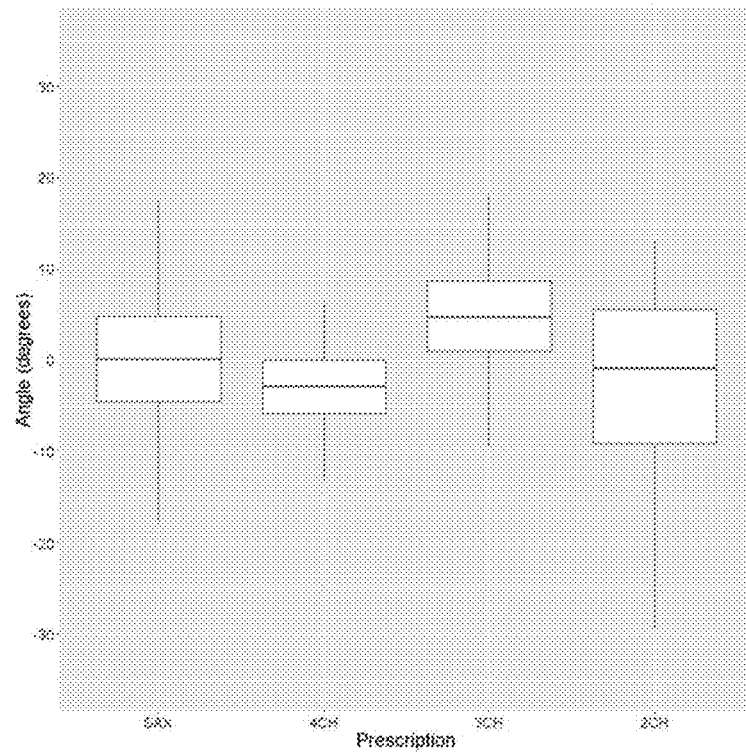

As a first step towards SAX localization, we first identified the MVS. The average distance between ground truth and predicted MVS localization was within 4.87±8.35 mm, −1.27±6.81°, and mean absolute difference was 4.93±4.86°. Using the SAX DL predicted landmarks, the 4-chamber, 3-chamber, and 2-chamber view planes were prescribed. 4-chamber plane prescription were within an average bias of 0.38±6.45° and mean absolute error of 5.16±3.80°, the 3-chamber within 0.13±12.70° and 9.02±8.83°, and 2-chamber within 0.25±9.08° and 6.53±6.28°. To further validate our approach of planning cardiac MRI planes using DL predicted landmarks, the DL-planes were compared to those prescribed by a technologist at the time of acquisition. The SAX DL-planes were within 0.40±7.20° and absolute mean angle difference was 5.56±4.60° compared to technologist acquired planes, the 4-chamber were within −2.67±7.01° and 5.49±5.06°, the 3-chamber within 4.29±7.68° and 7.19±4.97°, and 2-chamber within −2.36±9.83° and 8.00±6.03°. Table 2 provides a summary of the accuracy of deep learning predicted localization planes against expert ground truth planes (A) and retrospectively matched technologist planes (B) used during examination. FIGS. 15 A and 15B are plots of the data of Table 3.

TABLE 3

Figure 14B:
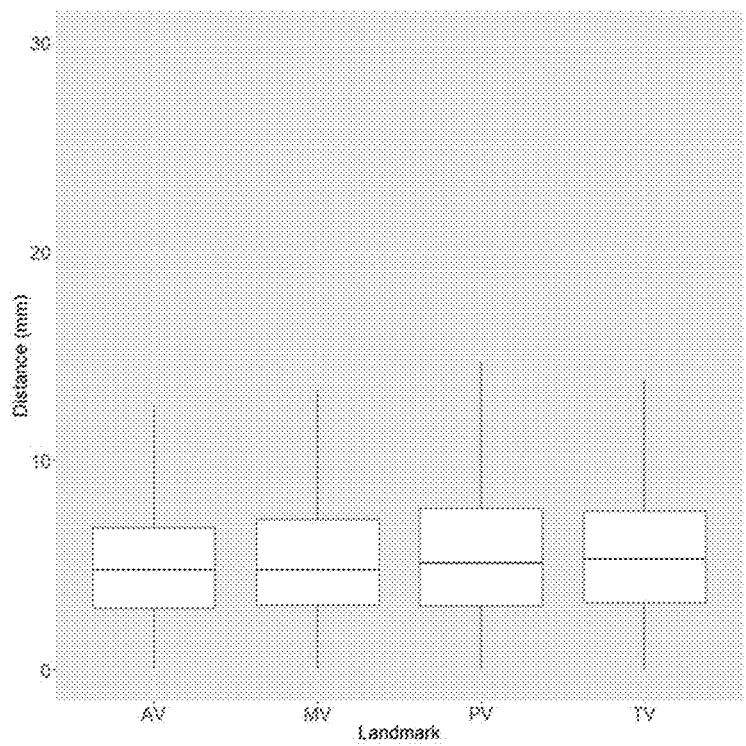

| Comparison | Value | Prescription Plane SAX 2-Chamber | | | |
| --- | --- | --- | --- | --- | --- |
| | | SAX | 4-Chamber | 3-Chamber | 2-Chamber |
| A) Ground Truth Annotation Plane | Angle Bias | −1.27 ± 6.81° | 0.38 ± 6.45° | 0.13 ± 12.70° | 0.25 ± 9.08° |
| | Angle Difference | 4.93 ± 4.86° | 5.16 ± 3.80° | 9.02 ± 8.63° | 6.53 ± 6.28° |
| B) Technologist Matched Plane | Angle Bias | 0.40 ± 7.20° | −2.67 ± 7.01° | 4.29 ± 7.68° | −2.36 ± 9.83° |
| | Angle Difference | 5.56 ± 4.60° | 5.49 ± 5.06° | 7.19 ± 4.97° | 8.00 ± 6.03° | on average within the 8-10 mm spacing between slices typically used for planar cardiac MRI at our institution. The majority of predicted MVS localizations (465, 94.32%) were within 1 slice of the labeled MVS. The second neural network was used to identify an in-plane bounding box around the heart on SAX images. These predicted segmentations had an average Dice score of 0.91±0.05, relative compared to ground truth bounding boxes. Of these predicted bounding boxes, 493 (100%) contained the AV, 492 (99.8%) contained the MV, 490 (99.39%) contained the PV, and 491 (99.59%) contained the TV. After standardizing bounding boxes to native resolution, there was only one case where the PV and TV localization were not contained within the input image for SAX-localization. The results of the MVS localization and bounding box were then combined to create the SAX-localization model. As seen in FIG. 14B, the average localization for SAX landmarks was 5.78±5.68 mm for AV, 5.90±5.24 mm for MV, 6.55±6.39 mm for PV, and 6.39±5.89 mm for TV.

To further assess SAX landmark localizations, we compared slices that were within a single slice error of the ground truth label (465, 94.32%), and slices that were two or more slices away (28, 5.78%). For SAX series within a single slice, average localization of the AV was within 5.24±3.33 mm compared to 14.60±17.66 mm (p<0.01) for two or more slice error, MV was within 5.01±3.79 mm for within one slice compared to 12.13±14.46 mm (p=0.02) for two slices, PV within 6.08±4.99 mm compared to 14.03±15.73 mm (p=0.01), and TV within 5.81±3.69 mm compared to 15.96±17.19 (p<0.01).

The DL predicted landmark localizations from the VLAX images were used to prescribe SAX planes in accordance with the standard cardiac MRI protocol. Comparison differences are reported in angle biases and absolute angle differences. Means and standard deviations are reported. The mean angle bias between DL and GT planes was In this example, we demonstrated the feasibility of using deep learning to localize cardiac landmarks for prescription of SAX, 4-chamber, 3-chamber, and 2 chamber view planes. For LAX images, this was readily accomplished with a single 2D U-net modified for in-plane heatmap regression. For localization on a SAX series, we applied a cascaded system of neural networks to localize key anatomic landmarks by first identifying the basal slice at the plane of the mitral valve. We found that this cascaded system to identify mitral valve slice correctly within a single slice for the vast majority of cases (94.32% of SAX inputs), and for these exams in-plane localization was within 10 mm. Furthermore, and perhaps more importantly, these localizations yielded imaging planes very similar to those marked by a radiologist or those prescribed by a technologist at the time of image acquisition.

Figure 16:
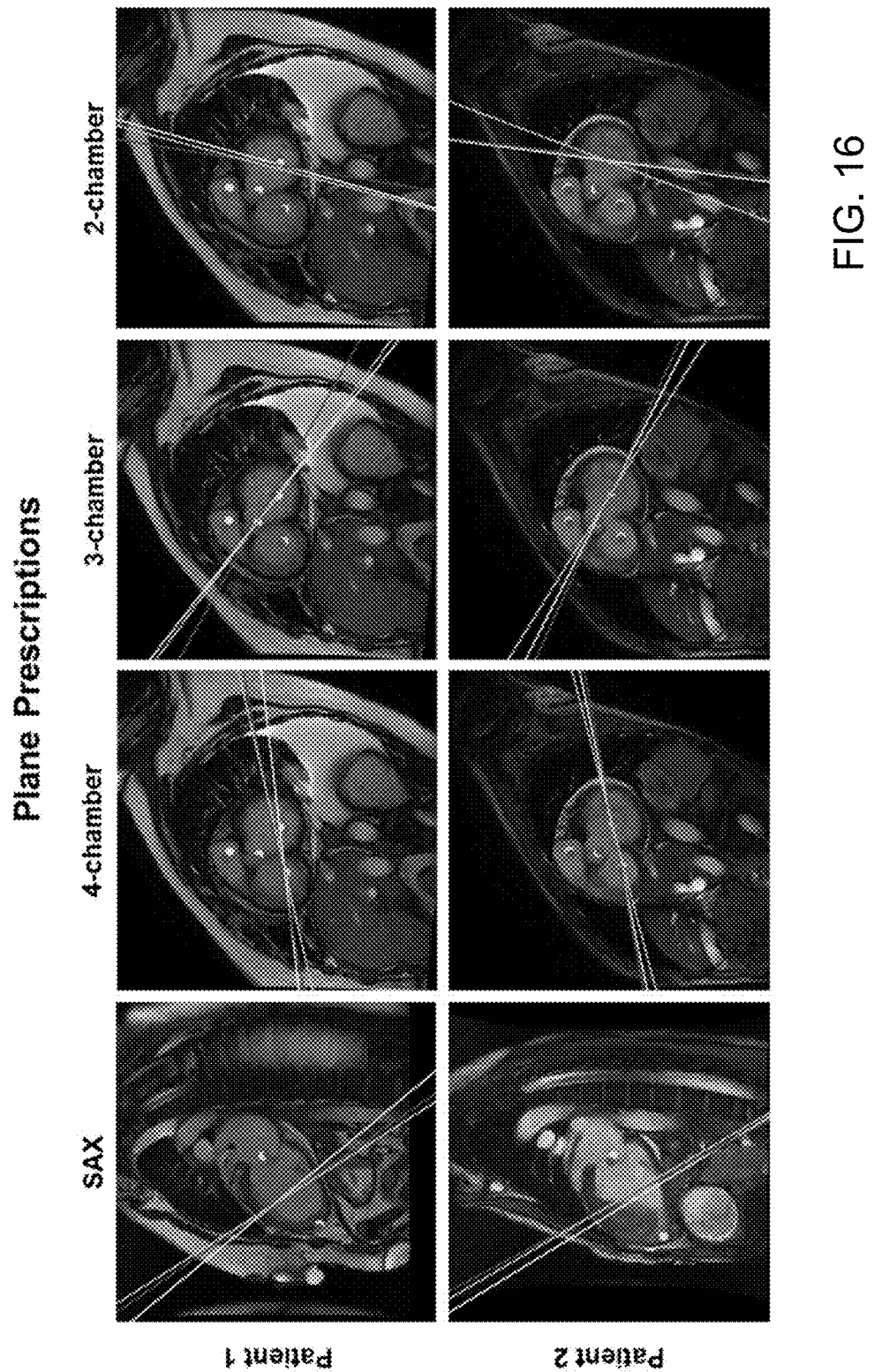
FIG. 16 provides exemplar images of short-axis (SAX), 4-chamber, 3-chamber, and 2-chamber plane prescription from two patient cases.

FIG. 16 provides exemplar images of short-axis (SAX), 4-chamber, 3-chamber, and 2-chamber plane prescription from two patient cases. Solid lines denote the imaging planes, while solid dots demarcate the localizations used to plan them. Ground truth is shown in yellow and the guidance system in red. The actual plane prescribed by the technologist is shown in teal. Note the large mass within the left ventricle in patient 2, which did not dramatically interfere with short axis prescription.

A few view planning systems have been proposed for cardiac MRI. Lelieveldt et al proposed planning a SAX plane using MRI scans of the entire thorax. Utilizing a deformable atlas, these authors identified the gross anatomical landmarks (including lungs, ventricles, and heart) to prescribe the SAX plane. This approach was validated by showing that clinical measurements including ventricular mass and ejection volume were not significantly different. However, the study did not identify the essential 4-chamber, 3-chamber, and 2-chamber LAX imaging planes that are necessary for the assessment of wall motion and valve function. More recently, other studies have utilized mesh segmentation-based approaches to plan sequences of view planes from a single 3D cardiac MRI acquisition. While promising, these approaches were developed using a more limited test population with the use of an additional acquisition that is not typically used in many cardiac practices.

Unlike these prior efforts, the inventive approach integrates a system of convolutional neural networks into a typical workflow of cardiac MRI, covering the heterogeneity of heart morphologies and disease states typically seen in clinical practice.

It should be noted that this example focused on two essential steps in the prescription of cardiac imaging planes, namely the identification of landmarks and planes from long-axis and short-axis images. The preceding steps of cardiac localization from axial or sagittal images was not explored in this study. Even with these limitations, the example demonstrates that a deep learning-based localization approach may be sufficient for cardiac MRI plane prescription. It is possible that the short-axis and long-axis localizations may be used to sequentially optimize imaging planes, as can be performed by skilled technologists or physicians.

REFERENCES (INCORPORATED HEREIN BY REFERENCE)

1. Gassenmaier, S. et al. Quantitative inversion time prescription for myocardial late gadolinium enhancement using T1-mapping-based synthetic inversion recovery imaging: reducing subjectivity in the estimation of inversion time. *Int. J. Cardiovasc. Imaging* (2018). doi:10.1007/s10554-017-1294-9
2. Pandey, T., et al., Utility of the inversion scout sequence (TI scout) in diagnosing myocardial amyloid infiltration. *Int. J. Cardiovasc. Imaging* 29, 103-112 (2013).
3. vanden Driesen, R. I., et al., M R findings in cardiac amyloidosis. *AJR Am. J. Roentgenol.* 186, 1682-1685 (2006).
4. Huber, A. M. et al. Phase-Sensitive Inversion-Recovery MR Imaging in the Detection of Myocardial Infarction. Radiology 237, 854-860 (2005).
5. Kellman, P., et al., Phase-sensitive inversion recovery for detecting myocardial infarction using gadolinium-delayed hyperenhancement. Magn. Reson. Med. 47, 372-383 (2002).
6. Margeta, J., et al., Fine-tuned convolutional neural nets for cardiac MRI acquisition plane recognition. *Comput. Methods Biomech. Biomed. Eng. Imaging Vis.* 5, 339-349 (2017).
7. Zhang, L. et al. Automated Quality Assessment of Cardiac M R Images Using Convolutional Neural Networks. in *Simulation and Synthesis in Medical Imaging* (eds. Tsaftaris, S. A., et al.) 138-145 (Springer International Publishing, 2016).
8. Sarraf, S., et al., DeepAD: Alzheimer's Disease Classification via Deep Convolutional Neural Networks using MRI and fMRI. bioRxiv 070441 (2016). doi:10.1101/070441
9. Korolev, S., et al., Residual and plain convolutional neural networks for 3D brain MRI classification. in 2017 *IEEE 14th International Symposium on Biomedical Imaging (ISBI* 2017) 835-838 (2017). doi:10.1109/ISBI.2017.7950647
10. Zhang, R. et al. Thyroid classification via new multi-channel feature association and learning from multi-modality MRI images. in 2018 *IEEE 15th International Symposium on Biomedical Imaging (ISBI* 2018) 277-280 (2018). doi:10.1109/ISBI.2018.8363573
11. Oksuz, I. et al. 15 Automatic mis-triggering artefact detection for image quality assessment of cardiac MRI. Heart 104, A5-A5 (2018).
12. Milletari, F. et al. Hough-CNN: Deep learning for segmentation of deep brain regions in MRI and ultrasound. Comput. Vis. Image Underst. 164, 92-102 (2017).
13. Kamnitsas, K. et al. Efficient multi-scale 3D CNN with fully connected CRF for accurate brain lesion segmentation. Med. Image Anal. 36, 61-78 (2017).
14. Pereira, S., et al., Brain Tumor Segmentation Using Convolutional Neural Networks in MRI Images. *IEEE Trans. Med. Imaging* 35, 1240-1251 (2016).
15. Prasoon, A. et al., Deep Feature Learning for Knee Cartilage Segmentation Using a Triplanar Convolutional Neural Network. in *Medical Image Computing and Computer-Assisted Intervention—MICCAI* 2013 246-253 (Springer, Berlin, Heidelberg, 2013). doi:10.1007/978-3-642-40763-5_31
16. Tran, P. V. A Fully Convolutional Neural Network for Cardiac Segmentation in Short-Axis MRI. ArXiv160400494 Cs (2016).
17. MIlletari, F., et al., V-Net: Fully Convolutional Neural Networks for Volumetric Medical Image Segmentation. in 2016 *Fourth International Conference on 3D Vision* (3DV) 565-571 (2016). doi:10.1109/3DV.2016.79
18. Emad, O., et al., Automatic localization of the left ventricle in cardiac MRI images using deep learning. in 2015 *37th Annual International Conference of the IEEE Engineering in Medicine and Biology Society (EMBC)* 683-686 (2015). doi:10.1109/EMBC.2015.7318454
19. Payer, C., et al., Regressing Heatmaps for Multiple Landmark Localization Using CNNs. in *Medical Image Computing and Computer-Assisted Intervention—MICCAI* 2016 (eds. Ourselin, S., et al.) 230-238 (Springer International Publishing, 2016).
20. Ulrich, N. H. et al. Diffusion tensor imaging for anatomical localization of cranial nerves and cranial nerve nuclei in pontine lesions: Initial experiences with 3T-MRI. J. Clin. Neurosci. 21, 1924-1927 (2014).
21. Chen, H. et al. Automatic Localization and Identification of Vertebrae in Spine CT via a Joint Learning Model with Deep Neural Networks. in *Medical Image Computing and Computer-Assisted Intervention—MICCAI* 2015 515-522 (Springer, Cham, 2015). doi:10.1007/978-3-319-24553-9 63
22. Rasti, R., et al., Breast cancer diagnosis in DCE-MRI using mixture ensemble of convolutional neural networks. *Pattern Recognit.* 72, 381-390 (2017).
23. Hosseini-Asl, E., et al., Alzheimer's Disease Diagnostics by a Deeply Supervised Adaptable 3D Convolutional Network. ArXiv160700556 Cs Q-Bio Stat (2016).
24. Hinton, G. E., Osindero, S. & Teh, Y.-W. A fast learning algorithm for deep belief nets. *Neural Comput.* 18, 1527-1554 (2006).
25. Liang, X. et al. Semantic Object Parsing with Local-Global Long Short-Term Memory. ArXiv151104510 Cs (2015).
26. Zhang, X., et al., Tree Recurrent Neural Networks with Application to Language Modeling. (2015).
27. Simonyan, K. & Zisserman, A. Very Deep Convolutional Networks for Large-Scale Image Recognition. ArXiv14091556 Cs (2014).
28. Hochreiter, S. & Schmidhuber, J. Long Short-Term Memory. Neural Comput 9, 1735-1780 (1997).

29. Zhao, R., et al., Saliency detection by multi-context deep learning. in 2015 *IEEE Conference on Computer Vision and Pattern Recognition (CVPR)* 1265-1274 (2015). doi: 10.1109/CVPR.2015.7298731
30. Papernot, N. et al. The Limitations of Deep Learning in Adversarial Settings. in 2016 *IEEE European Symposium on Security and Privacy (EuroS P)* 372-387 (2016). doi:10.1109/EuroSP.2016.36
31. Kotikalapudi, R. keras-vis. (2017).
32. Avendi, M. R., et al., Combined Deep-Learning and Deformable-Model Approach to Fully Automatic Segmentation of the Left Ventricle in Cardiac MRI. ArXiv151207951 Cs (2015).
33. Zhang, D. et al., A multi-level convolutional LSTM model for the segmentation of left ventricle myocardium in infarcted porcine cine MR images. in 2018 *IEEE 15th International Symposium on Biomedical Imaging (ISBI 2018)* 470-473 (2018). doi:10.1109/ISBI.2018.8363618
34. Xue, W. et al. Direct Estimation of Regional Wall Thicknesses via Residual Recurrent Neural Network. ArXiv170509728 Cs (2017).
35. Gerche A L, et al., Cardiac MRI: A New Gold Standard for Ventricular Volume Quantification During High-Intensity Exercise. *Circ Cardiovasc Imaging.* 2013; 6(2):329-338.
36. Suinesiaputra A, et al., Quantification of LV function and mass by cardiovascular magnetic resonance: multi-center variability and consensus contours. *J Cardiovasc Magn Reson.* BioMed Central; 2015; 17(1):63.
37. Ferguson M, Otto R. Cardiac MRI Prescription Planes. MedEdPORTAL Publ. MedEdPORTAL; 2014; (10).
38. Stokes M B, Roberts-Thomson R. The role of cardiac imaging in clinical practice. Aust Prescr. *NPS Medicine Wise;* 2017; 40(4): 151-155.
39. Crean A. Cardiovascular MR and CT in congenital heart disease. *Heart.* BMJ Publishing Group; 2007; 93(12): 1637-1647.
40. Goldfarb J W. Abstract 13092: Cardiac MRI Practice: An Analysis of 2012 and 2013 Medicare Provider Utilization and Payment Data. *Circulation.* 2015; 132 (Suppl 3)
41. Jackson C E, et al., Computerised planning of the acquisition of cardiac MR images. *Comput Med Imaging Graph.* Pergamon; 2004; 28(7):411-418.
42. Frick M, et al., Fully automatic geometry planning for cardiac MR imaging and reproducibility of functional cardiac parameters. *J Magn Reson Imaging.* 2011; 34(2): 457-467.
43. Lu X, et al., Automatic View Planning for Cardiac MRI Acquisition. Springer, Berlin, Heidelberg; 2011. p. 479-486 http://link.springer.com/10.1007/978-3-642-23626-6_59. Accessed Sep. 27, 2018.
44. Retson T, et al., Real-World Clinical Performance of Deep Learning for Segmentation and Quantification of Biventricular Cardiac Size and Function. Paris: International Society for Magnetic Resonance in Medicine; 2018.
45. Choi K J, et al., Development and Validation of a Deep Learning System for Staging Liver Fibrosis by Using Contrast Agent-enhanced CT Images in the Liver. *Radiology* 2018; 180763.
46. Chartrand G, et al., Deep Learning: A Primer for Radiologists. *RadioGraphics* 2017; 37(7):2113-2131.
47. Lieman-Sifry J, et al., FastVentricle: Cardiac Segmentation with ENet. Springer, Cham; 2017. p. 127-138.
48. Nam J G, et al., Development and Validation of Deep Learning-based Automatic Detection Algorithm for Malignant Pulmonary Nodules on Chest Radiographs. *Radiology* 2018; 180237
49. Payer C, et al., Regressing Heatmaps for Multiple Landmark Localization Using CNNs. Springer, Cham; 2016. p. 230-238.
50. Ronneberger O, et al, U-Net: Convolutional Networks for Biomedical Image Segmentation.
51. Cao Z, et al., Realtime Multi-Person 2D Pose Estimation using Part Affinity Fields. 2016.
52. Bahrami N, et al., Automated Selection of Myocardial Inversion Time with a Convolutional Neural Network. North Am Soc Cardiovasc Imaging. 2018.
53. Belharbi S, et al., Spotting L3 slice in CT scans using deep convolutional network and transfer learning. *Comput Biol Med.* 2017; 87:95-103.
54. Lelieveldt BPF, et al., Automated Observer-independent Acquisition of Cardiac Short-Axis MR Images: A Pilot Study. *Radiology.* 2001; 221:537-542.
55. Lopez-Mattei J C, Shah D J. The role of cardiac magnetic resonance in valvular heart disease. Methodist Debakey Cardiovasc J. Methodist DeBakey Heart & Vascular Center; 2013; 9(3):142-148.
56. Bloomer T N, et al., Cine MRI using steady state free precession in the radial long axis orientation is a fast accurate method for obtaining volumetric data of the left ventricle. *J Magn Reson Imaging.* 2001; 14(6): 685-692.
57. Wang K, et al., A Convolutional Neural Network-Based Automated Hepatic-Fat Quantification Method in Non-Alcoholic Fatty Liver Disease. *Int Soc Magn Reson Med Work Mach Learn.* 2018.

The invention claimed is:

1. A method for identification of an optimal image within a sequence of image frames, comprising:

inputting the sequence of image frames into a computer processor configured for executing a plurality of neural networks;

applying a sliding window to the sequence of image frames to identify a plurality of image frame windows within the sequence;

processing the plurality of image frame windows using a first neural network of the plurality, the first neural network trained for identifying spatial features within the image frames for first classifying the image frame window into spatial classes according to the identified spatial features;

processing the plurality of image frame windows using a second neural network of the plurality, the second neural network trained for identifying serial features among the image frames for second classifying the image frame windows into series classes according to the identified serial features;

concatenating the results of the first classifying and second classifying to separate each of the plurality of image frame windows into one of two classes, wherein image frame windows that include the optimal image are classified into one of the classes; and generating an output displaying image frame windows that include the optimal image.

2. The method of claim 1, wherein the sequence of image frames is an MRI time sequence and the serial features comprise time.

3. The method of claim 2, wherein the MRI time sequence comprises a T1 mapping sequence.

4. The method of claim 1, wherein the sequence of image frames is a stack of MRI slices and the serial features comprise location within the stack.

5. The method of claim 1, wherein the first neural network is a convolutional neural network (CNN).

6. The method of claim 5, wherein the CNN is VGG19.

7. The method of claim 1, wherein the second neural network is a recurrent neural network (RNN).

8. The method of claim 7, wherein the RNN is formed from layers comprising long short-term memory (LSTM) models.

9. The method of claim 8, wherein the LSTM models comprise a three serial bidirectional LSTM.

10. A method for identification of an optimal image within a sequence of image frames, comprising:
inputting the sequence of image frames into a computer processor configured for executing a plurality of neural networks;
applying a sliding window to the sequence of image frames to identify a plurality of image frame windows within the sequence;
processing the plurality of image frame windows using a convolutional neural network (CNN), the CNN trained for identifying spatial features within the image frames for first classifying the image frame window into spatial classes according to the identified spatial features;
processing the plurality of image frame windows using a recurrent neural network (RNN), the RNN trained for identifying serial features among the image frames for second classifying the image frame windows into series classes according to the identified serial features;
concatenating the outputs of the CNN and the RNN to separate each of the plurality of image frame windows into one of two classes, wherein image frame windows that include the optimal image are classified into one of the classes; and
generating an output displaying image frame windows that include the optimal image.

11. The method of claim 10, wherein the sequence of image frames is an MRI time sequence and the serial features comprise time.

12. The method of claim 11, wherein the MRI time sequence comprises a T1 mapping sequence.

13. The method of claim 10, wherein the sequence of image frames is a stack of MRI slices and the serial features comprise location within the stack.

14. The method of claim 10, wherein the CNN is VGG19.

15. The method of claim 10, wherein the RNN is formed from layers comprising long short-term memory (LSTM) models.

16. The method of claim 15, wherein the LSTM models comprise a three serial bidirectional LSTM.

17. A system for identifying an optimal image within a sequence of image frames, the system comprising:
at least one computer processor configured to acquire the sequence of image frames and apply a sliding window to identify a plurality of image frame windows within the sequence;
a spatial classification module configured for identifying spatial features within the image frames for first classifying the image frame windows into spatial classes according to the identified spatial features:
a temporal/sequential classification module configured for identifying serial features among the image frames for second classifying the image frame windows into series classes according to the identified serial features;
a concatenator module configured for combining the results of the first classifying and second classifying to separate each of the plurality of image frame windows into one of two classes, wherein image frame windows that include the optimal image are classified into one of the classes; and
a display module configured for generating an output display of the image frame windows that include the optimal image.

18. The system of claim 17, wherein the sequence of image frames is an MRI time sequence and the serial features comprise time.

19. The system of claim 18, wherein the MRI time sequence comprises a T1 mapping sequence.

20. The system of claim 17, wherein the sequence of image frames is a stack of MRI slices and the serial features comprise location within the stack.

21. The system of claim 17, wherein the spatial classification module and the temporal/sequential classification module are neural networks.

22. The system of claim 21, wherein the spatial classification module is a convolutional neural network (CNN).

23. The system of claim 21, wherein temporal/sequential classification module is a recurrent neural network (RNN).

24. The system of claim 23, wherein the RNN is formed from layers comprising long short-term memory (LSTM) models.

25. The system of claim 24, wherein the LSTM models comprise a three serial bidirectional LSTM.

* * * * *